United States Patent
Schmidt et al.

(10) Patent No.: US 12,423,947 B2
(45) Date of Patent: Sep. 23, 2025

(54) AUTOMATED LINKING OF DIAGNOSTIC IMAGES TO SPECIFIC ASSETS

(71) Applicant: Fluke Corporation, Everett, WA (US)

(72) Inventors: Matthew F. Schmidt, River Falls, WI (US); Michael D. Stuart, Issaquah, WA (US); Seyed Navid Roohani Isfahani, Everett, WA (US); Shreyas Shivaram Shastry, Everett, WA (US); Dileepa Prabhakar, Edmonds, WA (US); Ronald Ainsworth, American Fork, UT (US)

(73) Assignee: Fluke Corporation, Everett, WA (US)

( * ) Notice: Subject to any disclaimer, the term of this patent is extended or adjusted under 35 U.S.C. 154(b) by 341 days.

(21) Appl. No.: 18/305,047

(22) Filed: Apr. 21, 2023

(65) Prior Publication Data

US 2023/0343066 A1 Oct. 26, 2023

Related U.S. Application Data

(60) Provisional application No. 63/333,736, filed on Apr. 22, 2022.

(51) Int. Cl.
*G06V 10/74* (2022.01)
*G06T 7/50* (2017.01)
(Continued)

(52) U.S. Cl.
CPC .............. *G06V 10/761* (2022.01); *G06T 7/50* (2017.01); *G06T 7/62* (2017.01); *G06T 7/73* (2017.01);
(Continued)

(58) Field of Classification Search
CPC .... G06V 10/761; G06V 10/143; G06V 10/40; G06V 20/60; G06V 2201/10;
(Continued)

(56) References Cited

U.S. PATENT DOCUMENTS 9,176,990 B2 11/2015 Stuart et al.
9,726,715 B2 8/2017 Neeley et al.
(Continued)

OTHER PUBLICATIONS

Dearto, "Market | Dearto DTSL Pro series thermohygrometer AI automatic recognition and calibration system", Market | Dearto DTSL Pro series thermohygrometer AI automatic recognition and calibration system-Tai'an Dearto Automation Instrument Co., Ltd. (tadt.com.cn), downloaded Apr. 19, 23, 3 pages.
(Continued)

*Primary Examiner* — Jianxun Yang
(74) *Attorney, Agent, or Firm* — Seed Intellectual Property Law Group LLP

(57) ABSTRACT

Methods and apparatuses that utilize machine learning techniques to identify maintenance assets using sets of machine-health diagnostic images and link individual machine-health diagnostic images to the identified maintenance assets are described. The sets of machine-health diagnostic images may include a set of thermal images, a set of visible-light images, and/or a set of acoustic images. An identified maintenance asset may comprise an individual machine associated with a unique asset identifier. A diagnostic image linking system may acquire machine-health diagnostic images, apply object detection and other computer vision techniques to identify a particular machine within the machine-health diagnostic images, determine machine properties for the particular machine, generate a feature vector using the machine properties, select machine learning models corresponding with maintenance assets, generate predicted answers using the machine learning models, and generate an asset identifier for the particular machine based on the predicted answers.

20 Claims, 20 Drawing Sheets

(51) Int. Cl.
  *G06T 7/62* (2017.01)
  *G06T 7/73* (2017.01)
  *G06V 10/143* (2022.01)
  *G06V 10/40* (2022.01)
  *G06V 20/60* (2022.01)

(52) U.S. Cl.
  CPC ............ *G06V 10/143* (2022.01); *G06V 10/40* (2022.01); *G06V 20/60* (2022.01); *G06T 2207/10048* (2013.01); *G06T 2207/20081* (2013.01); *G06V 2201/10* (2022.01)

(58) Field of Classification Search
  CPC .. G06V 10/811; G06V 10/764; G06V 10/774; G06T 7/50; G06T 7/62; G06T 7/73; G06T 2207/10048; G06T 2207/20081; G06T 7/0004; G06F 16/5866; G06F 16/51; G06N 20/00
  See application file for complete search history.

(56) References Cited

U.S. PATENT DOCUMENTS

| | | | |
|---|---|---|---|
| 10,337,962 B2 | 7/2019 | Stuart et al. | |
| 2004/0005086 A1* | 1/2004 | Wolff | G06V 40/161 382/284 |
| 2021/0103770 A1* | 4/2021 | van Baar | G06F 18/214 |
| 2021/0311187 A1 | 10/2021 | Stuart et al. | |

OTHER PUBLICATIONS

SIKA, "Finally automated calibration with camera", SIKA Calibration Technology | Camera, downloaded Apr. 19, 23, 2 pages.

* cited by examiner

Diagnostic Image Linking System 140

Image Similarity Score Generator 230

Asset Profiles Database 232

Machine Learning Model Trainer 260

Machine Learning Models 262

Training Data Generator 270

Training Data 272

Machine 244
- Network Interface 245
- Processor 246
- Memory 247
- Disk 248

. . .

Machine 254
- Network Interface 255
- Processor 256
- Memory 257
- Disk 258

FIG. 2

| Asset Identifier | Predicted Answer for Color Images |
|---|---|
| Asset-X123 | 0.77 |
| Asset-X124 | 0.25 |
| Asset-X125 | 0.18 |
| Asset-X126 | 0.02 |

| Asset Identifier 370 | Predicted Answer from Thermal Images 372 | Predicted Answer from Color Images 373 | Predicted Answer from Acoustic Images 374 | Weighted Score 378 |
|---|---|---|---|---|
| Asset-X123 | 0.92 | 0.77 | 0.12 | 0.86 |
| Asset-X124 | 0.32 | 0.25 | 0.28 | 0.30 |
| Asset-X125 | 0.14 | 0.18 | 0.15 | 0.16 |
| Asset-X126 | 0.05 | 0.02 | 0.09 | 0.07 |

FIG. 3F

Ground Truth Feature Vectors Database 338

Feature Vectors For Asset-X123

Vector Group 340 {
Thermal: [0.16,1.0, 0.0, ..., 0.78] ~344
VL: [1.0,0.0, 0.02, ..., 0.52] ~345
VL: [1.0,0.0, 0.04, ..., 0.57] ~346
}

Feature Vectors For Asset-X125

Thermal: [0.82,0.0, 1.0, ..., 0.73]
VL: [0.0,1.0, 0.11, ..., 1.52]
VL: [0.0,1.0, 0.15, ..., 2.71]

FIG. 3H

Ground Truth Feature Vectors Database 338

Feature Vectors For Asset-X123

Vector Group 340 {
Thermal: [0.16,1.0, 0.0, ..., 0.78] ~344
VL: [1.0,0.0, 0.02, ..., 0.52] ~345
VL: [1.0,0.0, 0.04, ..., 0.57] ~346
}

Vector Group 342 {
Thermal: [0.17,1.0, 0.0, ..., 0.73] ~347
VL: [1.0,0.0, 0.08, ..., 0.52] ~348
VL: [1.0,0.0, 0.11, ..., 0.67] ~349
}

Feature Vectors For Asset-X125

Thermal: [0.82,0.0, 1.0, ..., 0.73]
VL: [0.0,1.0, 0.11, ..., 1.52]
VL: [0.0,1.0, 0.15, ..., 2.71]

FIG. 3I

AUTOMATED LINKING OF DIAGNOSTIC IMAGES TO SPECIFIC ASSETS

TECHNICAL FIELD

The present disclosure generally relates to the field of image processing, and in particular to systems and methods for identifying maintenance assets using images.

BACKGROUND

A computerized maintenance management system (CMMS) includes a database of maintenance assets and software for managing maintenance information and processes of maintenance operations for the maintenance assets. CMMS software is often employed to optimize the utilization and availability of the maintenance assets, which may comprise physical equipment, vehicles, machinery, and other assets. Machine condition monitoring may be used to assess the machine-health of the maintenance assets over time by monitoring various performance indicators, such as machine usage statistics, maintenance statistics, and machine efficiency. Rather than strictly following a maintenance schedule or simply waiting for a maintenance asset to fail before performing maintenance, the machine-health of the maintenance assets managed by the CMMS may be continuously monitored so that proactive decisions regarding machine maintenance may be made in real time.

A significant challenge in industrial maintenance workflows is getting the appropriate contextual information associated with machine-health diagnostic images, such as thermal images. An important piece of contextual information is the identification of the specific object or asset imaged (e.g., the asset ID). Other contextual information may include a technician's observations, machine operating state, load, ambient conditions, time and date, and/or location information for the specific object or asset imaged.

BRIEF SUMMARY

Systems and methods for identifying maintenance assets using machine-health diagnostic images and linking individual machine-health diagnostic images to identified maintenance assets are provided. The machine-health diagnostic images may include various types of images, such as thermal images, visible-light (VL) images, and/or acoustic images, captured using different imaging modalities (e.g., infrared sensor(s), VL sensor(s), and/or acoustic sensor(s). An identified maintenance asset may comprise an individual machine associated with a unique asset identifier or asset ID. In some cases, a diagnostic image linking system may acquire machine-health diagnostic images, apply object detection and other computer vision techniques to identify a particular machine using the machine-health diagnostic images, determine one or more machine properties for the particular machine using the machine-health diagnostic images, generate a set of feature vectors using the machine-health diagnostic images, select one or more machine learning models corresponding with maintenance assets within a collection of maintenance assets, generate one or more predicted answers using the one or more machine learning models and the set of feature vectors, generate an asset identifier for the particular machine using the one or more predicted answers, and display the asset identifier using a display of an electronic device. Several approaches that utilize machine learning techniques to automatically identify maintenance assets using sets of machine-health diagnostic images and/or link individual machine-health diagnostic images to identified maintenance assets are provided. Machine learning techniques, such as application of deep learning neural network algorithms, may be used in parallel on image files, video files, and/or audiovisual files to perform image classification, object detection, object localization (e.g., to identify a location of an object within an image and/or determine a bounding box around the object), optical character recognition (OCR) text extraction, and audio speech-to-text conversions for audio recordings.

According to some embodiments, the technical benefits of the systems and methods disclosed herein for identifying maintenance assets using machine-health diagnostic images and linking individual machine-health diagnostic images to identified maintenance assets include reducing the time to correctly identify maintenance assets, increasing the accuracy of correctly identifying and linking maintenance assets, increasing the operating efficiency of the maintenance assets, and reducing the overall costs for maintaining the maintenance assets.

BRIEF DESCRIPTION OF THE SEVERAL VIEWS OF THE DRAWINGS

Like-numbered elements may refer to common components in the different figures.

FIG. 2 depicts an embodiment of a diagnostic image linking system.

FIG. 3F depicts an embodiment of a table showing a mapping of asset identifiers to predicted answers generated using feature vectors deriving from thermal images, VL images, and acoustic images.

FIG. 3H depicts an embodiment of a ground truth feature vectors database that includes a first set of ground truth feature vectors associated with a first maintenance asset and a second set of ground truth feature vectors associated with a second maintenance asset.

FIG. 3I depicts an embodiment of the ground truth feature vectors database 338 after a third set of ground truth feature vectors associated with the first maintenance asset Asset-X123 have been added to the database 338.

DETAILED DESCRIPTION

Figure 1:
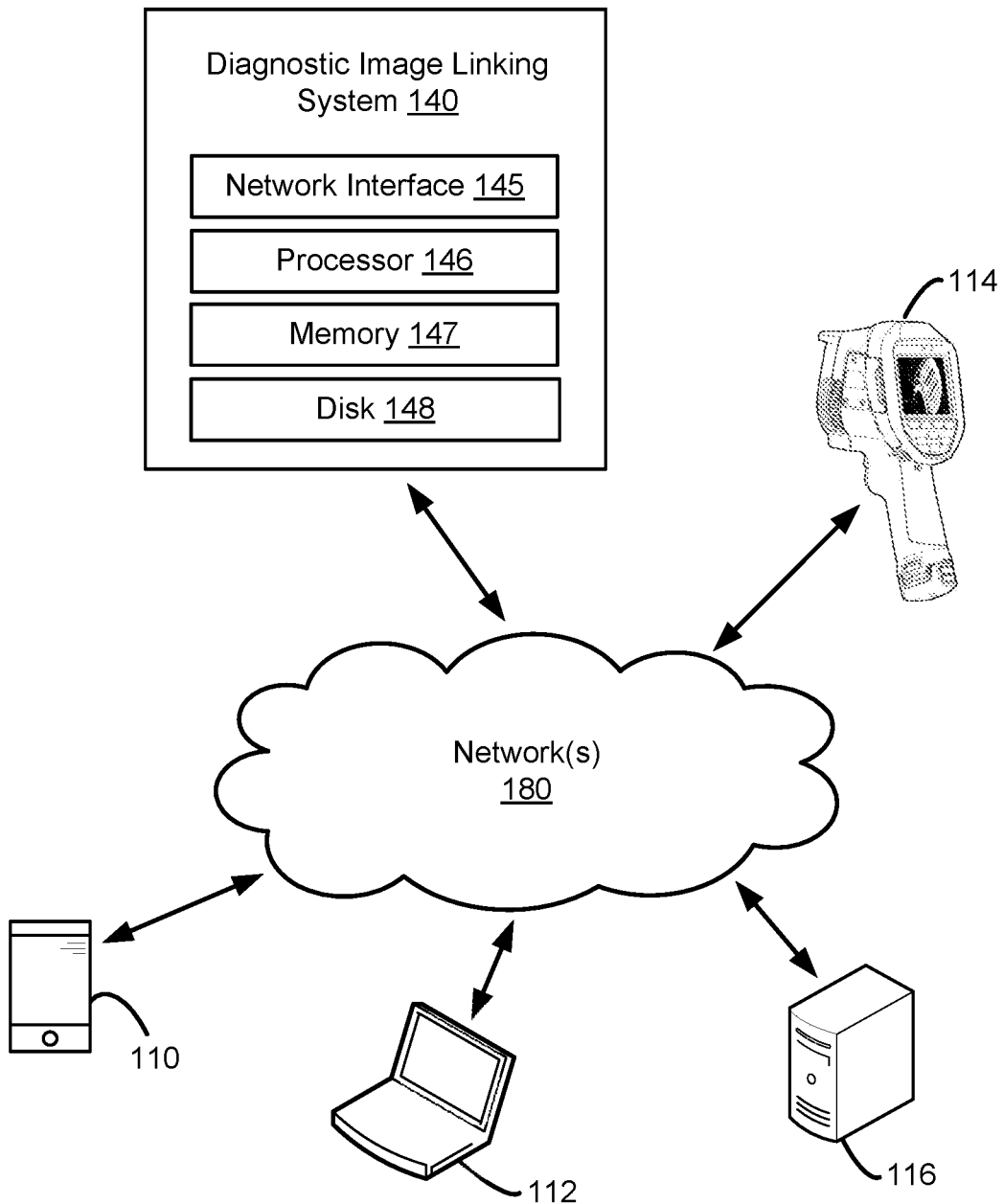
FIG. 1 depicts an embodiment of a networked computing environment.

Technology described herein utilizes machine learning techniques to automatically identify maintenance assets using sets of machine-health diagnostic images and link individual machine-health diagnostic images to the identified maintenance assets. In at least one example, the sets of machine-health diagnostic images may include one or more visible-light (VL) images, one or more thermal images, and/or one or more acoustic images. The machine-health diagnostic images may be grayscale images or color images (e.g., RGB images). In some cases, a thermal image may include a two-dimensional arrangement of pixels based on a field of view of a thermal camera that captured the thermal image, wherein each pixel is associated with temperature information (e.g., a temperature value) for a location of the pixel within the two-dimensional arrangement of pixels. An identified maintenance asset may comprise an individual machine or a specific piece of equipment associated with a unique asset identifier. In some cases, a diagnostic image linking system may acquire machine-health diagnostic imagery including thermal images, VL images, images that include acoustic information (e.g., derived from an acoustic sensor array), and/or blended images that include components of thermal image data, VL image data, infrared (IR) image data, and acoustic image data. Each of the VL, IR or acoustic images (or blended images) can be grayscale, color, or a mix of color or gray (e.g. for a picture-in-picture).

The diagnostic image linking system may acquire the sets of machine-health diagnostic images, apply object detection and other computer vision techniques to identify a particular machine or piece of equipment (e.g., a washing machine, an electrical panel, or other asset) within the sets of machine-health diagnostic images, and determine one or more machine properties for the particular machine or equipment (e.g., a temperature of the particular machine or a portion thereof, the dimensions of the exterior of the particular machine, the dimensions of the interior of the particular machine, a color of the particular machine, identification of components within the particular machine, and the dimensions of various external and internal features of the particular machine). The diagnostic image linking system may also extract textual information (e.g., extracted from textual overlays added to the images, from image metadata, or identified on an object using OCR) and metadata information from the sets of machine-health diagnostic images. In at least one example, a thermal image may include a text overlay associated with a temperature of an object or a portion of the object. In another example, a visible-light image may include a text overlay associated with a time and date that the image was captured. Textual information and the corresponding location of the textual information within an image may be identified from words or symbols displayed on the surface of a maintenance asset, such as on the exterior or interior surface of a washing machine or the exterior or interior surface of an electrical panel (e.g., breaker panel), using OCR techniques. The metadata information may include dates and times for when the sets of machine-health diagnostic images were captured and physical locations (e.g., a GPS location or an identification of a physical location within a building or other structure) corresponding with where the sets of machine-health diagnostic images were captured.

The diagnostic image linking system may generate a feature vector for the particular machine or equipment identified within the sets of machine-health diagnostic images, select one or more machine learning models corresponding with one or more maintenance assets, generate one or more predicted answers associated with probabilities (or confidence scores) that the feature vector corresponds with the one or more maintenance assets, and generate and display an asset identifier for the particular machine or equipment based on the probabilities that the feature vector corresponds with the one or more maintenance assets.

In some embodiments, the diagnostic image linking system may acquire one or more images of a particular machine or equipment, generate an image feature vector from the one or more images using a computer vision model or a machine learning model, and compare the generated image feature vector for the one or more images of the particular machine or equipment with a plurality of "ground truth" image feature vectors corresponding with a collection of maintenance assets in order to identify a set of maintenance assets that comprise the highest scoring maintenance assets or the maintenance assets with the greatest similarity (e.g., the top three most similar maintenance assets within the collection of maintenance assets). An asset identifier for the highest scoring maintenance asset may be identified and outputted from the diagnostic image linking system. The computer vision model may be built using convolutional neural networks, for example.

In some cases, the diagnostic image linking system may include a software application that matches a set of machine-health diagnostic images with a specific maintenance asset within a collection of maintenance assets by comparing machine learning generated information extracted from the set of machine-health diagnostic images with a database of ground truth data for the collection of maintenance assets. The diagnostic image linking system may identify a specific maintenance asset within the collection of maintenance assets with the best or closest match for the set of machine-health diagnostic images. The diagnostic image linking system may also identify a plurality of maintenance assets (e.g., the top three maintenance assets) within the collection of maintenance assets that are the highest ranking or closest matching assets for the set of machine-health diagnostic images. In some cases, one or more images of the set of machine-health diagnostic images may be stored in a file.

For example, an image data file (e.g., an IS2 file) may store thermal image data and/or VL image data. A thermal image may be linked with one or more corresponding VL images that capture the same object. In some cases, an image data file may store the set of machine-health diagnostic images (e.g., comprising one thermal image and six corresponding VL images).

A significant challenge with industrial maintenance workflows is obtaining the appropriate contextual information associated with a set of machine-health diagnostic images for a specific maintenance asset. An important piece of contextual information is the identification of the specific maintenance asset that has been captured by the set of machine-health diagnostic images (e.g., an asset ID comprising an alphanumeric code that uniquely identifies the specific maintenance asset). Other contextual information for the specific maintenance asset may include the operating state of the specific maintenance asset, ambient conditions at the time the set of machine-health diagnostic images were captured, the time and date of when the set of machine-health diagnostic images were captured, and a location of where the set of machine-health diagnostic images were captured. A machine learning model may be used to generate and/or extract the contextual information from the set of machine-health diagnostic images.

Although asset tagging (e.g., affixing a physical tag or label to a surface of an asset) may greatly improve the ability to identify a specific maintenance asset captured by a set of machine-health diagnostic images, an asset tag affixed to the specific maintenance asset may not have been captured by the set of machine-health diagnostic images or an asset tag may not have been associated with the set of machine-health diagnostic images by a camera operator or maintenance technician in the field capturing the set of machine-health diagnostic images. Although location information (e.g., geo-location information) embedded within metadata for the set of machine-health diagnostic images may be used to identify a reduced set of possible maintenance assets (e.g., a set of 20 maintenance assets out of a collection of 2,000 maintenance assets), the location information itself may not provide sufficient information to uniquely identify a specific maintenance asset if a number of the maintenance assets are located in close proximity to each other.

Another issue is that maintenance technicians collecting machine-health diagnostic images may link the machine-health diagnostic images to an incorrect maintenance asset due to human error. A technical benefit of automatically identifying maintenance assets from machine-health diagnostic images and then linking the machine-health diagnostic images to the identified maintenance assets is that the time to correctly identify the maintenance assets may be reduced and the accuracy of correctly identifying the maintenance assets may be increased.

A set of machine-health diagnostic images may include, for example, a first set of thermal images (or infrared images), a second set of VL images, and a third set of acoustic images. A diagnostic image linking system may apply image classification, object detection, and image similarity (e.g., clustering images based on visual similarity) techniques to the set of machine-health diagnostic images to generate a feature vector characterizing a machine that has been captured by the set of machine-health diagnostic images. The diagnostic image linking system may then compare (e.g., using a distance metric) the feature vector to corresponding feature vectors of "ground truth" data for a collection of maintenance assets to generate similarity scores and to identify a specific maintenance asset within the collection of maintenance assets with the best match or greatest similarity to the machine captured by the set of machine-health diagnostic images.

The diagnostic image linking system may generate a first similarity score using the first set of thermal images, a second similarity score using the second set of VL images, and a third similarity score using the third set of acoustic images. The diagnostic image linking system may compute a weighted overall similarity score using the first similarity score, the second similarity score, and the third similarity score. The weighted coefficients may be determined based on a type of image (e.g., depending on whether an image is a thermal image or a VL image), a class of machine (e.g., depending on whether the machine has been classified as a washing machine or a car) and/or a size or volume of the machine identified using the machine-health diagnostic images (e.g., depending on whether the volume of the machine is greater than a threshold volume or whether a width or height dimension of the machine is greater than a threshold width or height). The weighted coefficients may also be determined based on an estimated distance from the capturing device or camera that captured the machine-health diagnostic images to the machine. The weighted coefficients may also be determined based on whether textual information was extracted from or embedded within the machine-health diagnostic images as metadata.

In at least one example, the weighted coefficient for the first similarity score may be reduced (e.g., cut in half) if the estimated distance from the thermal camera to the machine is greater than a threshold distance (e.g., is greater than ten feet). In another example, the weighted coefficient for the second similarity score may be set based on the estimated distance from the VL camera to the machine.

In some embodiments, the set of machine-health diagnostic images may include a first set of thermal images capturing an exterior of a maintenance asset, a second set of thermal images capturing an interior of the maintenance asset, a third set of VL images capturing an exterior of the maintenance asset, and a fourth set of VL images capturing an interior of the maintenance asset. In at least one example, the maintenance asset may comprise a washing machine and the images of the interior of the washing machine may capture components of the washing machine when the door of the washing machine is open, such as images of the washing machine drum, or when the washing machine has been opened for maintenance, such as images of a filter, water pump, or water inlet valve for the washing machine.

The diagnostic image linking system may generate a first feature vector using the first set of thermal images, a second feature vector using the second set of thermal images, a third feature vector using the third set of VL images, and a fourth feature vector using the fourth set of VL images. In at least one embodiment, an image feature vector represents a set of images (e.g., thermal or VL images). An image feature vector may characterize and numerically quantify the contents of the set of images. An image feature vector may comprise, for example, a one-dimensional tensor. In another embodiment, the feature vector may comprise a feature vector for an object or machine identified within the set of images using computer vision techniques and/or machine learning techniques.

After the feature vectors have been determined, the four feature vectors may be applied to trained machine learning models for a particular maintenance asset of a collection of maintenance assets to generate four different similarity scores associated with probabilities that the four different sets of machine-health diagnostic images captured the particular maintenance asset. The diagnostic image linking system may identify an asset identifier for the particular maintenance asset using the four similarity scores and transmit the asset identifier to a user computing device to display a unique identification (e.g., an asset ID) for the maintenance asset. In at least one example, a weighted average of the four similarity scores may be calculated and used to identify the asset identifier for the maintenance asset.

A technical benefit of utilizing a combination of machine learning techniques to automatically identify maintenance assets from different sets of machine-health diagnostic images and then link the different sets of machine-health diagnostic images to specific maintenance assets (e.g., mapping the different sets of machine-health diagnostic images to unique asset IDs for the specific maintenance assets) is that the time to correctly identify the maintenance assets may be reduced and the accuracy of correctly identifying the maintenance assets may be increased, thereby increasing the overall efficiency and reducing the overall costs for maintaining the maintenance assets. Moreover, a technical advantage of using a combination of machine learning techniques and approaches is increased flexibility depending upon the contextual information that is available within an existing collection of maintenance assets.

Moreover, a technical benefit of dynamically setting the weighted coefficients for calculating a weighted overall similarity score based on the type of machine-health diagnostic images, a classification for a machine identified within the machine-health diagnostic images, and/or an estimated size or volume of the machine identified using the machine-health diagnostic images is that the accuracy of correctly identifying the maintenance assets may be increased.

FIG. 1 depicts an embodiment of a networked computing environment 100 in which the disclosed technology may be practiced. The networked computing environment 100 includes a plurality of computing devices interconnected through one or more networks 180. The plurality of computing devices may include mobile computing devices (e.g., a smartphone) and non-mobile computing devices (e.g., a desktop computer). The one or more networks 180 allow a particular computing device to connect to and communicate with another computing device. The depicted computing devices include a mobile phone 110, a laptop computing device 112, a thermal camera 114, a hardware server 116, and a diagnostic image linking system 140. In some embodiments, the plurality of computing devices may include other computing devices not shown or exclude one or more of the computing devices that are shown. In some embodiments, the plurality of computing devices may include more than or less than the number of computing devices depicted in FIG. 1. The one or more networks 180 may include a cellular network, a mobile network, a wireless network, a wired network, a secure network such as an enterprise private network, an unsecure network such as a wireless open network, a local area network (LAN), a wide area network (WAN), the Internet, or a combination of networks. Each network of the one or more networks 180 may include hubs, bridges, routers, switches, and wireless or wired transmission media such as a wired network or direct-wired connection.

In some embodiments, computing devices within the networked computing environment 100 may comprise real hardware computing devices or virtual computing devices, such as one or more virtual machines. Networked storage devices within the networked computing environment 100 may comprise real hardware storage devices or virtual storage devices, such as one or more virtual disks. The real hardware storage devices may include non-volatile and volatile storage devices.

Networked computing environment 100 may provide a cloud computing environment for one or more computing devices. Cloud computing may refer to Internet-based computing, wherein shared resources, software, and/or information are provided to the one or more computing devices on-demand via the Internet (or other network). The term "cloud" may be used as a metaphor for the Internet, based on the cloud drawings used in computer networking diagrams to depict the Internet as an abstraction of the underlying infrastructure it represents.

In some embodiments, the thermal camera 114 may simultaneously (or near simultaneously) capture a thermal image and one or more visible-light images. By capturing a thermal image of a machine or equipment at the same time as capturing one or more visible-light images, the thermal camera 114 may synchronize the acquisition of two different types of images for the machine or equipment of interest. In other embodiments, the thermal camera 114 may simultaneously (or near simultaneously) capture a thermal image, a visible-light image, and an acoustic image of a machine or equipment within a field of view of the thermal camera 114, using different imaging modalities (e.g., thermal, visible light, and acoustic imaging). The thermal camera 114 may include, for example, an infrared (IR) thermal imager and one or more visible-light cameras, or an IR thermal imager, one or more visible-light cameras, and an acoustic imager (e.g., microphone array).

The diagnostic image linking system 140 may perform processes that identify maintenance assets using sets of machine-health diagnostic images and link individual machine-health diagnostic images to the identified maintenance assets. The diagnostic image linking system 140 may acquire sets of machine-health diagnostic images from a database that stores diagnostic images or from one or more cameras or image capturing devices.

At least one embodiment of the diagnostic image linking system 140 includes a network interface 145, processor 146, memory 147, and disk 148 all in communication with each other. The network interface 145 allows diagnostic image linking system 140 to connect to one or more networks 180. The network interface 145 may include a wireless network interface and/or a wired network interface. The processor 146 allows diagnostic image linking system 140 to execute computer readable instructions stored in memory 147 in order to perform processes discussed herein. The processor 146 may include one or more processing units, such as one or more CPUs and/or one or more GPUs. The memory 147 may comprise one or more types of memory (e.g., RAM, SRAM, DRAM, ROM, EEPROM, or Flash). The memory 147 may comprise a hardware storage device. The processor 146 and memory 147 may be configured to allow diagnostic image linking system 140 to store, train, and/or deploy machine learning models for identifying maintenance assets using sets of machine-health diagnostic images and linking subsets of machine-health diagnostic images to identified maintenance assets.

In some cases, the server 116 may comprise a server within a data center. The data center may include one or more servers, such as server 160, in communication with one or more storage devices. The servers and data storage devices within a data center may be in communication with each other via a networking fabric connecting server data storage units within the data center to each other. In general, a "server" may refer to a hardware device that acts as the host in a client-server relationship or a software process that shares a resource with or performs work for one or more clients. Communication between computing devices in a client-server relationship may be initiated by a client sending a request to the server asking for access to a particular resource or for particular work to be performed. The server may subsequently perform the actions requested and send a response back to the client.

FIG. 2 depicts an embodiment of the diagnostic image linking system 140 in FIG. 1. The diagnostic image linking system 140 may utilize one or more machine learning models to determine predicted answers for whether a subset of machine-health diagnostic images captures a particular maintenance asset and to identify an asset identifier for the particular maintenance asset. As depicted, the diagnostic image linking system 140 includes an image similarity score generator 230, an asset profiles database 232, machine learning model trainer 260, machine learning models 262, training data generator 270, and training data 272. The machine learning models 262 may comprise one or more machine learning models that are stored in a memory, such as memory 147 in FIG. 1 or memory 247 in FIG. 2. The one or more machine learning models may be trained, executed, and/or deployed using one or more processors, such as processor 146 in FIG. 1 or processor 246 in FIG. 2. The one or more machine learning models may include neural networks (e.g., deep neural networks), support vector machine models, decision tree-based models, k-nearest neighbor models, Bayesian networks, or other types of models such as linear models and/or non-linear models. A linear model may be specified as a linear combination of input features. A neural network may comprise a feed-forward neural network, recurrent neural network, or a convolutional neural network.

The diagnostic image linking system 140 also includes a set of machines including machine 244 and machine 254. In some cases, the set of machines may be grouped together and presented as a single computing system. Each machine of the set of machines may comprise a node in a cluster (e.g., a failover cluster). The cluster may provide computing and memory resources for the diagnostic image linking system 140. In at least one example, instructions and data (e.g., input feature data) may be stored within the memory resources of the cluster and used to facilitate operations and/or functions performed by the computing resources of the cluster. The machine 244 includes a network interface 245, processor 246, memory 247, and disk 248 all in communication with each other. The processor 246 allows machine 244 to execute computer readable instructions stored in memory 247 to perform processes described herein. The disk 248 may include a hard disk drive and/or a solid-state drive. The machine 254 includes a network interface 255, processor 256, memory 257, and disk 258 all in communication with each other. The processor 256 allows machine 254 to execute computer readable instructions stored in memory 257 to perform processes described herein. The disk 258 may include a hard disk drive and/or a solid-state drive. In some cases, the disk 258 may include a flash-based SSD or a hybrid HDD/SSD drive.

In at least one embodiment, the depicted components of the diagnostic image linking system 140 that includes the image similarity score generator 230, asset profiles database 232, machine learning model trainer 260, machine learning models 262, training data generator 270, and training data 272 may be implemented using the above-referenced set of machines. In another embodiment, one or more of the depicted components of the diagnostic image linking system 140 may be operated in the cloud or in a virtualized environment that allows virtual hardware to be created and decoupled from the underlying physical hardware.

The diagnostic image linking system 140 may utilize the machine learning model trainer 260, machine learning models 262, training data generator 270, and training data 272 to implement one or more machine learning algorithms, such as supervised machine learning algorithms. Supervised machine learning may refer to machine learning methods where labeled training data is used to train or generate a machine learning model or set of mapping functions that maps input feature vectors to output predicted answers. The trained machine learning model may then be deployed to map new input feature vectors to predicted answers. Supervised machine learning may be used to solve regression and classification problems. A regression problem is where the output predicted answer comprises a numerical value. Regression algorithms may include linear regression, polynomial regression, and logistic regression algorithms. A classification problem is where the output predicted answer comprises a label (or an identification of a particular class). Classification algorithms may include support vector machine, decision tree, k-nearest neighbor, and random forest algorithms.

In some cases, a support vector machine algorithm may determine a hyperplane (or decision boundary) that maximizes the distance between data points for two different classes. The hyperplane may separate the data points for the two different classes and a margin between the hyperplane and a set of nearest data points (or support vectors) may be determined to maximize the distance between the data points for the two different classes.

In some cases, a k-nearest neighbor algorithm may determine a set of test data points and a set of training data points, identify a distance function, calculate distances between a selected data point of the set of test data points to each of the set of training data points using the distance function, and then sort the calculated distances to identify a subset of the set of training data points that are closest to the selected data point (e.g., the k-nearest neighbors to the selected data point). The distance function may calculate a Euclidean distance, a Manhattan distance, or a Hamming distance. In at least one example, the k-nearest neighbor algorithm may comprise an approximate k-nearest neighbor algorithm that utilizes navigable small world graphs with controllable hierarchy.

During a training phase, a machine learning model, such as one of the machine learning models 262, may be trained using the machine learning model trainer 260 to generate predicted answers using a set of labeled training data, such as training data 272. The training data 272 may be stored in a memory, such as memory 147 in FIG. 1 or memory 247 in FIG. 2. In some cases, labeled data may be split into a training data set and an evaluation data set prior to or during the training phase. In some cases, the training data generator 270 may determine the training data set and the evaluation data set to be applied during the training phase. In at least one example, the training data set may correspond with historical data corresponding with a period of time (e.g., data generated over the past year or month) or image data corresponding with a particular type of capturing device (e.g., thermal images or VL images).

The machine learning model trainer 260 may implement a machine learning algorithm that uses a training data set from the training data 272 to train the machine learning model and uses the evaluation data set to evaluate the predictive ability of the trained machine learning model. The predictive performance of the trained machine learning model may be determined by comparing predicted answers generated by the trained machine learning model with the target answers in the evaluation data set (or "ground truth" values). For a linear model, the machine learning algorithm may determine a weight for each input feature to generate a trained machine learning model that can output a predicted answer. In some cases, the machine learning algorithm may include a loss function and an optimization technique. The loss function may quantify the penalty that is incurred when a predicted answer generated by the machine learning model does not equal the appropriate target answer. The optimization technique may seek to minimize the quantified loss. One example of an appropriate optimization technique is online stochastic gradient descent.

The diagnostic image linking system 140 may configure one or more machine learning models to implement a machine learning classifier that categorizes input features into one or more classes. The one or more machine learning models may be utilized to perform binary classification (assigning an input feature vector to one of two classes) or multi-class classification (assigning an input feature vector to one of three or more classes). The output of the binary classification may comprise a prediction score that indicates the probability that an input feature vector belongs to one of two particular classes. In some cases, a binary classifier may correspond with a function that may be used to decide whether or not an input feature vector (e.g., a vector of numbers representing the input features) should be assigned to either a first class or a second class. The binary classifier may use a classification algorithm that outputs predictions based on a linear predictor function combining a set of weights with the input feature vector. For example, the classification algorithm may compute a scalar product between the input feature vector and a vector of weights and then assign the input feature vector to the first class if the scalar product exceeds a threshold value.

The number of input features (or input variables) of a labeled data set may be referred to as its dimensionality. In some cases, dimensionality reduction may be used to reduce the number of input features that are used for training a machine learning model. The dimensionality reduction may be performed via feature selection (e.g., reducing the dimensional feature space by selecting a subset of the most relevant features from an original set of input features) and feature extraction (e.g., reducing the dimensional feature space by deriving a new feature subspace from the original set of input features). With feature extraction, new features may be different from the input features of the original set of input features and may retain most of the relevant information from a combination of the original set of input features. In at least one example, feature selection may be performed using sequential backward selection and unsupervised feature extraction may be performed using principal component analysis.

In some embodiments, the machine learning model trainer 260 may train a first machine learning model with historical training data over a first time period (e.g., the past month) using a first number of input features and may train a second machine learning model with historical training data over a second time period greater than the first period of time (e.g., the past year) using a second number of input features less than the first number of input features. The machine learning model trainer 260 may perform dimensionality reduction to reduce the number of input features from a first number of input features (e.g., 500) to a second number of input features less than the first number of input features (e.g., 100).

The machine learning model trainer 260 may train the first machine learning model using one or more training or learning algorithms. For example, the machine learning model trainer 260 may utilize backwards propagation of errors (or backpropagation) to train a multi-layer neural network. In some cases, the machine learning model trainer 260 may perform supervised training techniques using a set of labeled training data. In other cases, the machine learning model trainer 260 may perform unsupervised training techniques using a set of unlabeled training data. The machine learning model trainer 260 may perform a number of generalization techniques to improve the generalization capability of the machine learning models being trained, such as weight-decay and dropout regularization.

In some embodiments, the training data 272 may include a set of training examples. In at least one example, each training example of the set of training examples may include an input-output pair, such as a pair comprising an input vector and a target answer (or supervisory signal). In another example, each training example of the set of training examples may include an input vector and a pair of outcomes corresponding with a first decision to perform a first action (e.g., to output an asset identifier) and a second decision to not perform the first action (e.g., to not output an asset identifier). In this case, each outcome of the pair of outcomes may be scored and a positive label may be applied to the higher scoring outcome while a negative label is applied to the lower scoring outcome.

In some cases, the asset profiles database 232 may store machine-specific data for a collection of maintenance assets. The machine-specific data may include the dimensions of a machine or equipment, a temperature of the machine or equipment, locations of various external and internal features of the machine (e.g., locations of various dials and buttons on the outside of the machine and the types of components and their locations inside the machine) or equipment, and one or more machine learning models that were derived from images of the machine or equipment. In at least one example, the collection of maintenance assets may comprise a collection of 2,000 washing machines. In another example, the collection of maintenance assets may comprise a collection of 10,000 hardware servers in a data center. In yet another example, the collection of maintenance assets may comprise 5,000 electrical panels. Thus, it should be understood that a collection of maintenance assets may comprise any number of maintenance assets of a particular or related type(s) of asset(s).

For each maintenance asset of the collection of maintenance assets, the asset profiles database 232 may store a set of machine properties for the maintenance asset and one or more machine learning models for the maintenance asset. In at least one embodiment, the set of machine properties may include external dimensions of the maintenance asset, a color associated with an external appearance of the maintenance asset, and an identification of components located inside the maintenance asset. The set of machine properties may comprise one or more machine properties and may include a set of external dimensions of the machine (e.g., a height, width, or depth of a machine), a set of internal dimensions of an interior space of the machine, and a set of components located within an interior space of the machine. The one or more machine learning models for the maintenance asset may include a first machine learning model associated with thermal image properties of the maintenance asset and a second machine learning model associated with VL image properties of the maintenance asset. In at least one embodiment, the maintenance asset may comprise a washing machine and a first machine learning model for the washing machine may be generated using a training data set that includes a plurality of thermal images of the washing machine, e.g., captured while the washing machine is in operation.

In some embodiments, the image similarity score generator 230 may acquire or generate a first feature vector from a set of thermal images of an unidentified maintenance asset and acquire or generate a second feature vector from a set of VL images of the unidentified maintenance asset. The image similarity score generator 230 may apply the first feature vector to a first machine learning model to generate a first predicted answer associated with a first probability that the first feature vector matches a particular maintenance asset of the collection of maintenance assets and apply the second feature vector to a second machine learning model to generate a second predicted answer associated with a second probability that the second feature vector matches the particular maintenance asset. In some cases, the image similarity score generator 230 may generate a weighted overall similarity score that includes multiplying the first probability by a first coefficient and the second probability by a second coefficient and then summing the products.

Figure 3A:
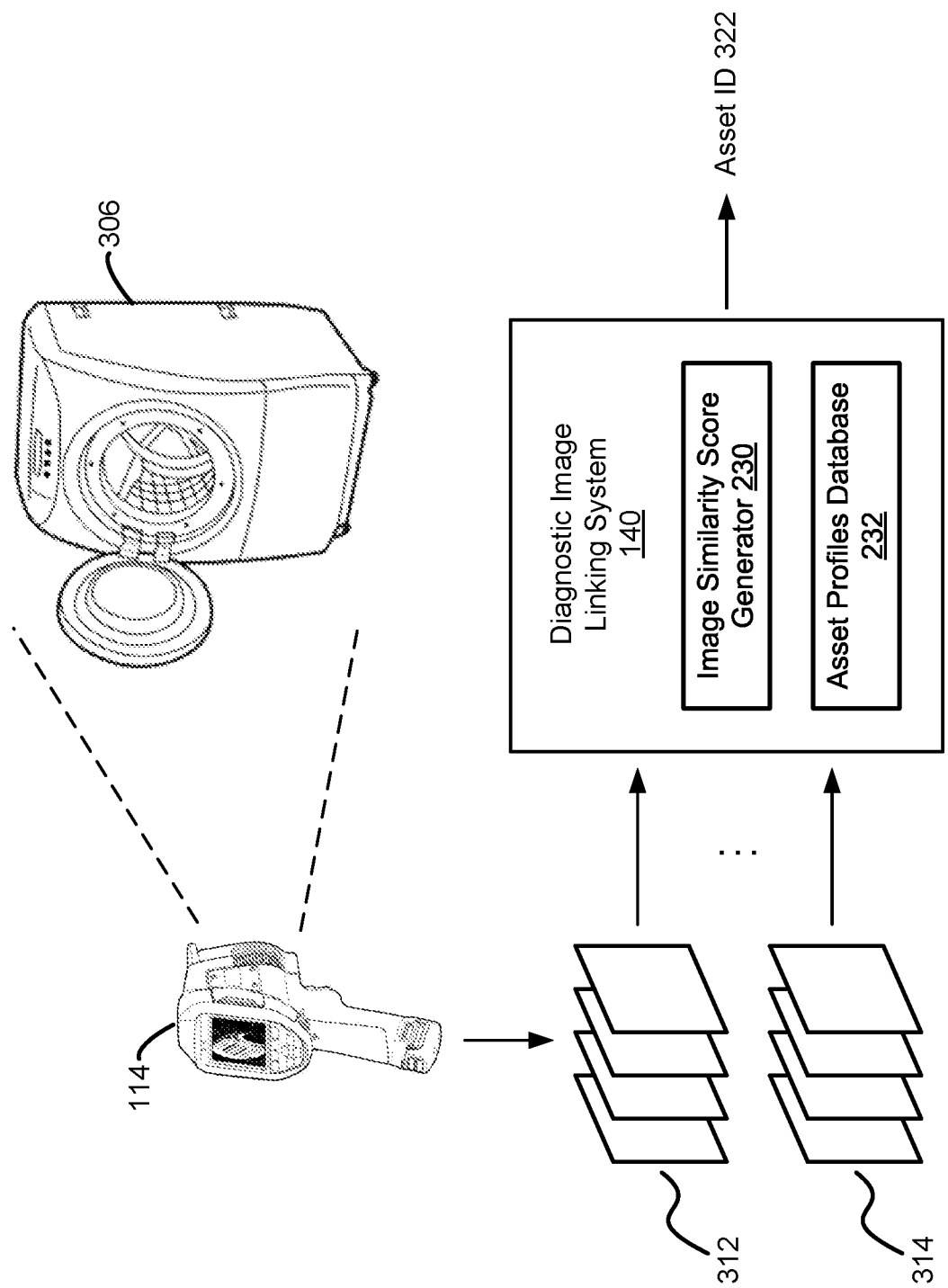
FIG. 3A depicts an embodiment of a process for acquiring sets of images of a maintenance asset and generating a unique asset identifier for the maintenance asset using the sets of images.

FIG. 3A depicts an embodiment of a process for acquiring sets of images of a maintenance asset and generating a unique asset identifier for the maintenance asset using the sets of images. The diagnostic image linking system 140 may acquire a set of thermal images 312 from the thermal camera 114. The set of thermal images 312 may capture various angles and fields of view that include the maintenance asset 306. The diagnostic image linking system 140 may also acquire a set of VL images 314 as well as other sets of images not depicted. In some cases, the other sets of images not depicted may include acoustic images of the maintenance asset 306 and thermal images of the interior of the maintenance asset 306. In some cases, both the set of thermal images 312 and the set of VL images 314 may be stored using an electronic file (e.g., an IS2 file). Both the set of thermal images 312 and the set of VL images 314 may comprise simultaneously (or near simultaneously) captured images.

The diagnostic image linking system 140 may generate a set of feature vectors using the set of images and apply the set of feature vectors to a set of machine learning models in order to generate a set of predicted answers for each maintenance asset within a collection of maintenance assets stored within the asset profiles database 232. The image similarity score generator 230 may compute overall similarity scores for each maintenance asset and then identify the maintenance asset of the collection of maintenance assets that has the highest overall similarity score. The maintenance asset with the highest overall similarly score may be deemed to be the best matching maintenance asset within the collection of maintenance assets for the set of images and a corresponding asset identifier 322 may be outputted for the highest scoring maintenance asset. In some cases, the diagnostic image linking system 140 may acquire a set of images including the set of thermal images 312 and the set of VL images 314 and output two or more asset identifiers (e.g., three asset identifiers) including the asset identifier 322 that corresponds with the top two or more best scoring maintenance assets.

For each image of a set of diagnostic images, the diagnostic image linking system 140 may apply one or more pre-trained machine learning models to generate an asset-match-likelihood vector for that image. Each asset-match-likelihood vector may then be compared with ground truth feature vectors stored within a ground truth feature vectors database using, e.g., cosine similarity or by calculating Euclidian distances. The one or more pre-trained machine learning models may include a convolutional neural network, for example, that generates an asset-match-likelihood vector with n-dimensions (e.g., 512 dimensions). The generated asset-match-likelihood vector may be inputted to a classifier that outputs an asset identifier corresponding with the highest scoring asset within a collection of maintenance assets for the asset-match-likelihood vector.

Figures 3B, 3C:
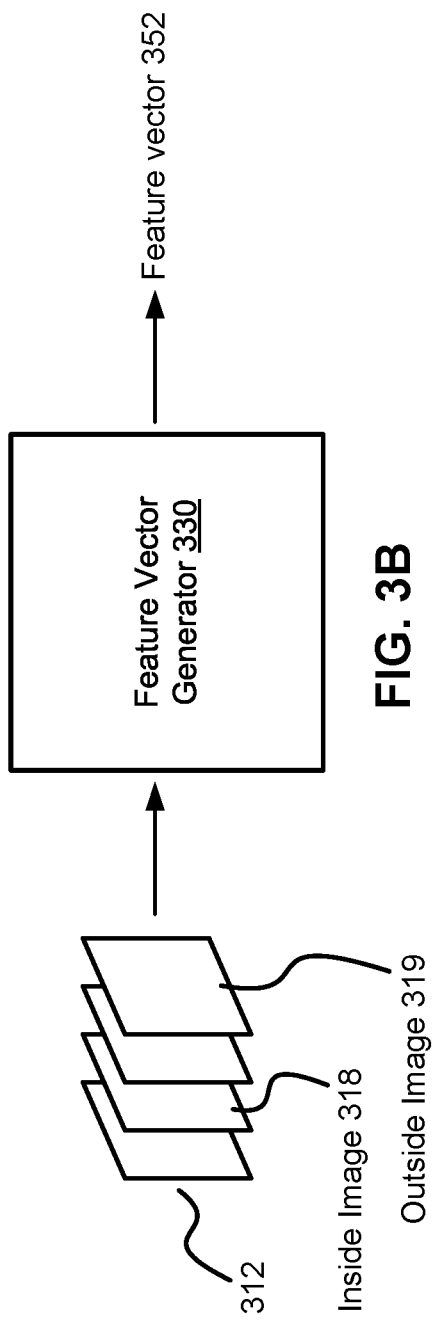
FIG. 3B depicts an embodiment of a feature vector generator generating a feature vector given a set of thermal images.
FIG. 3C depicts an embodiment of a table showing a mapping of asset identifiers to predicted answers associated with a probability that a feature vector corresponds with a particular maintenance asset.

FIG. 3B depicts an embodiment of a feature vector generator generating a feature vector given a set of thermal images. As depicted, the feature vector generator 330 acquires a set of thermal images 312 and outputs a corresponding feature vector 352. The set of thermal images 312 includes a first image 318 that captures an interior view of a maintenance asset and a second image 319 that captures an exterior view of the maintenance asset. In this case, the feature vector 352 may correspond with both the exterior appearance of the maintenance asset and the interior appearance of the maintenance asset. In at least one example, the feature vector 352 may include data that characterizes the external dimensions of the maintenance asset, the interior dimensions of the maintenance asset, an exterior thermal signature for the maintenance asset while the maintenance asset is operational, and an interior thermal signature for the maintenance asset while the maintenance asset is operational.

In at least one embodiment, the feature vector generator 330 may utilize one or more machine learning models to generate the feature vector 352. The feature vector generator 330 may utilize image recognition and feature extraction techniques to extract useful features from the set of thermal images 312, which may then be used as input features to a separate machine learning system or neural network to output a prediction or classification. As an example, an extracted feature may comprise a numerically quantifiable value associated with a portion of an image, such as a distinct color or identified shape, line, or edge.

FIG. 3C depicts an embodiment of a table showing a mapping of asset identifiers to predicted answers associated with a probability or likelihood that the feature vector 352 corresponds with a particular maintenance asset. The predicted answers may comprise confidence scores that the feature vector 352 corresponds with a particular maintenance asset. As depicted, the four maintenance assets associated with the asset identifiers Asset-X123, Asset-X124, Asset-X125, and Asset-X126 in column 370 may comprise four maintenance assets out of a collection of maintenance assets. Each of the asset identifiers Asset-X123, Asset-X124, Asset-X125, and Asset-X126 map to one of the predicted answers in column 372. The predicted answers in column 372 contain a probability or likelihood that the mapped maintenance asset is the best matching maintenance asset for the feature vector, which ranges from low value of 0 to a high value of 1. The maintenance asset 382 associated with the asset identifier Asset-X123 maps to a predicted answer that the probability or likelihood that the maintenance asset Asset-X123 comprises the best matching maintenance asset for the feature vector 352 is 0.92. The maintenance asset 386 associated with the asset identifier Asset-X125 maps to a predicted answer that the probability or likelihood that the maintenance asset Asset-X125 comprises the best matching maintenance asset for the feature vector 352 is 0.14.

Figures 3D, 3E:
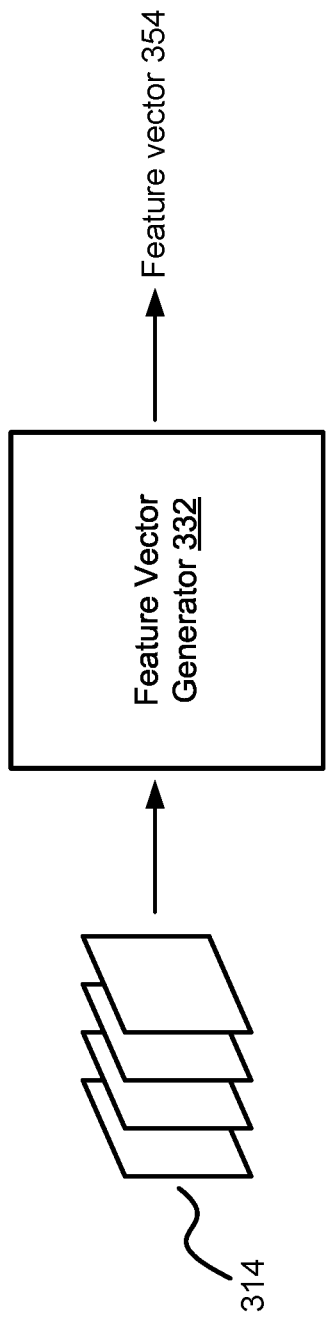
FIG. 3D depicts an embodiment of a feature vector generator generating a feature vector given a set of VL images.
FIG. 3E depicts an embodiment of a table showing a mapping of asset identifiers to predicted answers associated with a probability that a feature vector corresponds with a particular maintenance asset.

FIG. 3D depicts an embodiment of a feature vector generator generating a feature vector given a set of VL images. As depicted, the feature vector generator 332 acquires a set of VL images 314 and outputs a corresponding feature vector 354. The set of VL images 314 may include a first image that captures an interior view of a maintenance asset and a second image that captures an exterior view of the maintenance asset. In this case, the feature vector 354 may correspond with both the exterior appearance of the maintenance asset and the interior appearance of the maintenance asset. In at least one example, the feature vector 354 may include data that characterizes the external dimensions of the maintenance asset, the interior dimensions of the maintenance asset, exterior visual properties for the maintenance asset, and interior visual properties for the maintenance asset. In some embodiments, the set of images acquired by the feature vector generator 332 may comprise depth images of the exterior and interior of a maintenance asset and the feature vector generator 332 may output a feature vector that is generated using the depth images. The depth images may be captured, for example, using a time-of-flight camera that determines distances from the camera to objects within a field of view of the camera.

FIG. 3E depicts an embodiment of a table showing a mapping of asset identifiers to predicted answers associated with a probability or likelihood that the feature vector 354 corresponds with a particular maintenance asset. As depicted, the four maintenance assets associated with the asset identifiers Asset-X123, Asset-X124, Asset-X125, and Asset-X126 in column 370 may comprise four maintenance assets out of a collection of 2,000 maintenance assets. Each of the asset identifiers Asset-X123, Asset-X124, Asset-X125, and Asset-X126 map to one of the predicted answers in column 373. The maintenance asset 382 associated with the asset identifier Asset-X123 maps to a predicted answer that the probability or likelihood that the maintenance asset Asset-X123 comprises the best matching maintenance asset for the feature vector 354 is 0.77. The maintenance asset 386 associated with the asset identifier Asset-X125 maps to a predicted answer that the probability or likelihood that the maintenance asset Asset-X125 comprises the best matching maintenance asset for the feature vector 354 is 0.18.

FIG. 3F depicts an embodiment of a table showing a mapping of asset identifiers in column 370 to predicted answers in columns 372, 373, and 374 generated using feature vectors deriving from thermal images, VL images, and acoustic images. The table also shows overall similarity scores in column 378 for each of the asset identifiers in column 370. The overall similarity scores may, as indicated, comprise weighted scores. As depicted, the maintenance asset 382 associated with the asset identifier Asset-X123 maps to a predicted answer that the probability that the maintenance asset Asset-X123 comprises the best matching maintenance asset for the feature vector generated from thermal images is 0.92, maps to a predicted answer that the probability that the maintenance asset Asset-X123 comprises the best matching maintenance asset for the feature vector generated from VL images is 0.77, maps to a predicted answer that the probability that the maintenance asset Asset-X123 comprises the best matching maintenance asset for the feature vector generated from acoustic images is 0.12, and the overall similarity score associated with the probability that the maintenance asset Asset-X123 comprises the best matching maintenance asset for all the feature vectors is 0.86. As depicted in FIG. 3F, the overall similarity score 392 (or weighted score) for the maintenance asset Asset-X123 is 0.86 (or 86%) and the overall similarity score 396 (or weighted score) for the maintenance asset Asset-X125 is 0.16 (or 16%).

The maintenance asset 386 associated with the asset identifier Asset-X125 maps to a predicted answer that the probability that the maintenance asset Asset-X125 comprises the best matching maintenance asset for the feature vector generated from thermal images is 0.14, maps to a predicted answer that the probability that the maintenance asset Asset-X125 comprises the best matching maintenance asset for the feature vector generated from VL images is 0.18, maps to a predicted answer that the probability that the maintenance asset Asset-X125 comprises the best matching maintenance asset for the feature vector generated from acoustic images is 0.15, and the overall similarity score associated with the probability that the maintenance asset Asset-X125 comprises the best matching maintenance asset for all the feature vectors is 0.16.

After the overall similarity scores have been computed for each of the maintenance assets within a collection of maintenance assets, the highest scoring maintenance asset with the greatest overall similarity score may be selected as best matching maintenance asset and a unique asset identifier for the best matching maintenance asset (e.g., Asset-X123) may be outputted or transmitted to an electronic device for display on the electronic device.

In reference to FIG. 3A, in some embodiments, the diagnostic image linking system 140 may be configured to match a set of machine-health diagnostic images with a specific maintenance asset within a collection of maintenance assets by comparing image features extracted from the set of machine-health diagnostic images with a database of ground truth image feature data for the collection of maintenance assets, generating image similarity scores for the comparisons, ranking the image similarity scores, and outputting the specific maintenance asset as the best or closest match for the set of machine-health diagnostic images. An image distance or similarity measure (e.g., a Euclidean distance or cosine similarity) may be used to compare and rank the set of machine-health diagnostic images with the ground truth image feature data for the collection of maintenance assets.

Machine learning techniques may be used to identify and extract the image features from the set of machine-health diagnostic images. The set of machine-health diagnostic images may be captured by a maintenance technician using a camera, such as the thermal camera 114 in FIG. 1, during maintenance or repair of a maintenance asset in the field. In some embodiments, the diagnostic image linking system 140 may apply content-based image retrieval techniques that extract and analyze the contents of an image (e.g., the presence of colors, shapes, and textures within the image) and other image retrieval techniques that extract and analyze image text and image metadata including keywords or an image description associated with the image to identify the most similar images out of a collection of images for a given input machine-health diagnostic image. In some cases, the image retrieval techniques may extract low-level features, such as textures, colors, and shapes, from the machine-health diagnostic image. In some cases, the diagnostic image linking system 140 may apply OCR text extraction to identify image text within a machine-health diagnostic image.

The diagnostic image linking system 140 may identify a set of grouped images corresponding with a machine-health diagnostic image to be linked to a specific maintenance asset within a collection of maintenance assets. The set of grouped images may include, for example, a thermal image of a machine or equipment and a set of visible-light images of the same machine or equipment. Image time stamp information and/or sequential file numbering for the set of grouped images may be used to identify the set of grouped images. For example, a set of images all taken at the same time or substantially the same time (e.g., within five seconds of each other) by the same camera may be identified as a set of grouped images.

For each image within the set of machine-health diagnostic images (e.g., captured using a camera operated by a maintenance technician), the diagnostic image linking system 140 may generate a feature vector comprising an asset-match-likelihood vector for that image. The generated set of asset-match-likelihood vectors for the set of machine-health diagnostic images may be compared with ground truth image feature data for a collection of maintenance assets.

In at least one embodiment, for each maintenance asset within the collection of maintenance assets, similarity scores for the set of asset-match-likelihood vectors may be computed and a weighted average of the resulting similarity scores may be determined. In one example, for a particular type of maintenance asset, similarity scores for thermal images may be weighed more than similarity scores for visible-light images. In another example, similarity scores for visible-light images that include corresponding textual information may be weighed more than similarity scores without corresponding textual information. In yet another example, similarity scores for external images of a machine or equipment may be weighed less than similarity scores for internal images of the machine or equipment. The weighted averages for each maintenance asset within the collection of maintenance assets may be ranked in order to identify the specific maintenance asset within the collection of maintenance assets with the highest weighted average. The weighted coefficients may be set based on confidence factors associated with generating extracted contextual information. An asset identifier (or asset ID) for the specific maintenance asset may be identified, outputted, transmitted, or displayed. The asset identifier for the specific maintenance asset may be identified via a lookup table for the specific maintenance asset.

In some cases, rather than computing weighted averages for each maintenance asset within the collection of maintenance assets, a hierarchical approach that prioritizes similarity scores for certain types of images (e.g., prioritizing similarity scores for thermal images or similarity scores for acoustic images) may be utilized. In other cases, for each maintenance asset within the collection of maintenance assets, similarity scores for the set of asset-match-likelihood vectors may be determined and the highest overall similarity score out of the similarity scores for the set of asset-match-likelihood vectors may be selected and compared with the highest overall similarity scores for the other assets within the collection of maintenance assets to identify the specific maintenance asset within the collection of maintenance assets with the highest overall similarity score.

Figure 3G:
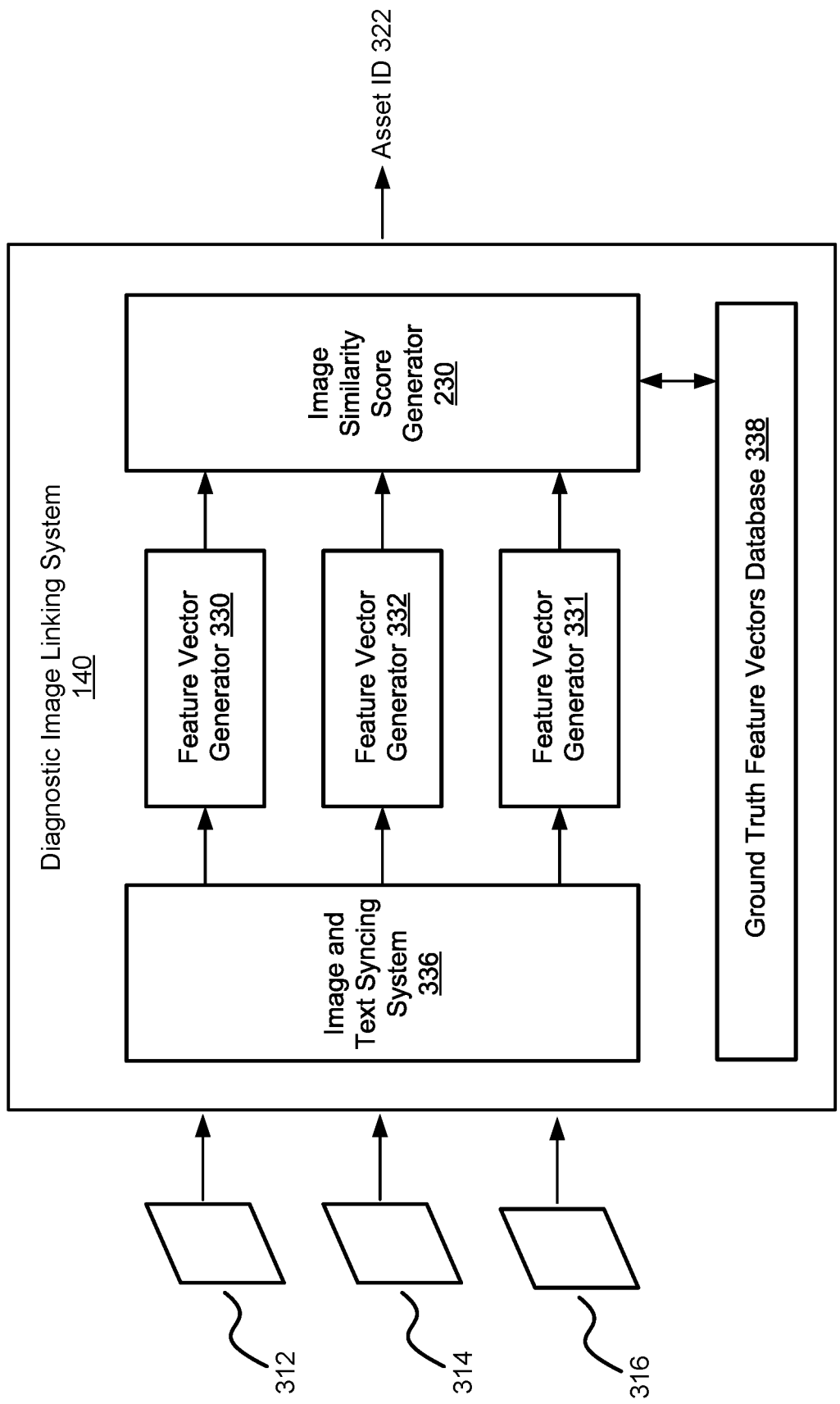
FIG. 3G depicts an embodiment of a diagnostic image linking system that acquires a set of machine-health diagnostic images and outputs an asset identifier corresponding with a specific maintenance asset within a collection of maintenance assets with the greatest image similarity with the set of machine-health diagnostic images.

FIG. 3G depicts an embodiment of a diagnostic image linking system 140 that acquires a set of machine-health diagnostic images and outputs an asset identifier 322 ("Asset ID") corresponding with a specific maintenance asset within a collection of maintenance assets with the greatest image similarity with the set of machine-health diagnostic images. The set of machine-health diagnostic images may include a set of thermal images 312, a set of VL images 314, and a set of acoustic images 316. The asset identifier for the specific maintenance asset may be displayed to a maintenance technician who may confirm the specific maintenance asset as the correct maintenance asset captured by the set of machine-health diagnostic images. Upon confirmation of the correct maintenance asset from the maintenance technician, the set of machine-health diagnostic images may be linked with the asset identifier for the specific maintenance asset and stored within a database of ground truth image feature data for the collection of maintenance assets, such as the ground truth feature vectors database 338. Therefore, as maintenance technicians confirm correct maintenance assets, the database of ground truth image feature data may grow to include a greater number of correctly-linked image feature vectors or asset-match-likelihood vectors for a collection of maintenance assets.

As depicted in FIG. 3G, the diagnostic image linking system 140 includes a ground truth feature vectors database 338, an image and text syncing system 336, an image similarity score generator 230, and feature vector generators 330, 331, 332. The feature vector generator 330 may acquire a set of thermal images 312 and output a corresponding thermal-image based feature vector. The feature vector generator 332 may acquire a set of VL images 314 and output a corresponding VL image based feature vector. The feature vector generator 331 may acquire a set of acoustic images 316 and output a corresponding acoustic-image based feature vector. The image and text syncing system 336 may identify the set of thermal images 312, the set of VL images 314, and the set of acoustic images 316 as comprising a synchronized group of images that capture a common machine or maintenance asset (or asset).

The image and text syncing system 336 may acquire timestamp information and file naming information (e.g., as consecutive file numbers may infer images that were captured within a short time period) for the set of thermal images 312, the set of VL images 314, and the set of acoustic images 316 to identify the synchronized group of images. In one example, the set of thermal images 312, the set of VL images 314, and the set of acoustic images 316 may comprise images that were captured at substantially the same time using the same camera, such as the camera 114 in FIG. 1. In another example, the image and text syncing system 336 may identify the set of thermal images 312, the set of VL images 314, and the set of acoustic images 316 as comprising a synchronized group of images that capture a common machine or maintenance asset if the timestamp information for the images proves that the images were captured within a threshold period of time (e.g., are captured within two minutes of each other).

In at least one example, a synchronized group of images may include a thermal image of an interior space of an electrical panel, a VL image of the interior space of the electrical panel, and a VL image of an exterior view of the electrical panel. Textual information detected within the VL image of the exterior view of the electrical panel may be added to metadata of the thermal image of the interior space of the electrical panel such that an image feature vector or an asset-match-likelihood vector for the thermal image of the interior space of the electrical panel may include a feature associated with the textual information (e.g., an asset label for the electrical panel).

The image and text syncing system 336 may identify textual information within a first set of images (e.g., within the set of thermal images 312) and apply the textual information to a second set of images (e.g., the set of acoustic images 316) if the first set of images and the second set of images are deemed to comprise a synchronized group of images that capture a common machine or maintenance asset. In one example, an asset label or text appearing on the surface of a maintenance asset captured by a VL image may be attached to one or more other images within the synchronized group of images.

Each of the feature vector generators 330-332 may include one or more machine learning models or one or more neural networks (e.g., a convolutional neural network) that have been trained to generate an image feature vector or an asset-match-likelihood vector for an inputted set of images. The image similarity score generator 230 may take the asset-match-likelihood vectors generated by the feature vector generators 330-332 as inputs and output an asset identifier 322 ("Asset ID") that corresponds with a specific maintenance asset that best matches a maintenance asset captured by the set of thermal images 312, the set of VL images 314, and the set of acoustic images 316. In at least one example, an image distance or similarity measure (e.g., a Euclidean distance or cosine similarity) may be used to compare the asset-match-likelihood vectors with ground truth feature vectors stored within the ground truth feature vectors database 338. Cosine similarity may provide, for example, a measure of similarity between two sequences of numbers or between an asset-match-likelihood vector and a ground truth feature vector associated with a particular maintenance asset.

FIG. 3H depicts an embodiment of a ground truth feature vectors database 338 that includes a first set of ground truth feature vectors associated with a first maintenance asset Asset-X123 and a second set of ground truth feature vectors associated with a second maintenance asset Asset-X125. The first set of ground truth feature vectors include a ground truth feature vector 344 associated with a thermal image of the first maintenance asset, a ground truth feature vector 345 associated with a VL image of the first maintenance asset (e.g., a VL image of an interior of the first maintenance asset), and a ground truth feature vector 346 associated with another VL image of the first maintenance asset (e.g., a VL image of an exterior of the first maintenance asset). The first set of ground truth feature vectors may comprise feature vectors for a vector group 340. The vector group 340 may have been identified by the image and text syncing system 336 as a synchronized group of images that capture a common machine or maintenance asset.

FIG. 3I depicts an embodiment of the ground truth feature vectors database 338 after a third set of ground truth feature vectors associated with the first maintenance asset Asset-X123 have been added to the database 338. The third set of ground truth feature vectors include a ground truth feature vector 347 associated with a thermal image of the first maintenance asset, a ground truth feature vector 348 associated with a VL image of the first maintenance asset, and a ground truth feature vector 349 associated with another VL image of the first maintenance asset. The third set of ground truth feature vectors may comprise feature vectors for a vector group 342. In some embodiments, a maintenance technician may have simultaneously or nearly simultaneously captured a set of diagnostic images associated with the vector group 342 using a camera, such as camera 114 in FIG. 1. The diagnostic image linking system 140 of FIG. 3G may take the set of diagnostic images as input and generate an asset identifier that is displayed to the maintenance technician using a display of a computing device, such as the mobile phone 110 in FIG. 1. The maintenance technician may confirm that the asset identifier is the correct asset identifier for the set of diagnostic images. Upon confirmation that the set of diagnostic images should be linked to the asset identifier generated by the diagnostic image linking system 140, the asset-match-likelihood vectors for the set of diagnostic images may be stored as ground truth feature vectors for the first maintenance asset within the ground truth feature vectors database 338.

In some embodiments, in order to determine a degree of similarity between the feature vectors of the vector group 342 and the feature vectors of the vector group 340, a first similarity score may be determined by comparing the feature vector 347 associated with a thermal image with the feature vector 344 associated with a thermal image using a similarity or distance measure (e.g., a cosine similarity or Euclidean distance) and a second similarity score may be determined by comparing the feature vector 345 associated with a VL image with the feature vector 348 associated with a VL image using a similarity or distance measure. In at least one example, an average similarity score may be computed from the first similarity score and the second similarity score and an overall similarity score may comprise the average similarity score. In another example, the highest similarity score out of the first similarity score and the second similarly score may be identified as an overall similarity score.

In some embodiments, in response to detecting that feature vectors associated with a newly added vector group, such as the feature vectors for the vector group 342, have been added to the ground truth feature vectors database 338, the diagnostic image linking system 140 of FIG. 3G may compare the feature vectors of the vector group 340 with the feature vectors for the vector group 342 in order to detect similarity deviations between corresponding types of images. For example, the feature vector 347 associated with a thermal image may be compared with the feature vector 344 associated with a thermal image in order to determine whether the two feature vectors have at least a threshold degree of similarity. If a degree of similarity or distance (e.g., based on a cosine similarity or a Euclidean distance) is greater than a threshold degree of similarity or distance, then a feature vector deviation may be detected and an output alert may be displayed using a display of a computing device. In some cases, the diagnostic image linking system 140 may detect deviations in feature vectors for grouped images that have been linked to the same maintenance asset; some technical benefits of detecting deviations in feature vectors for grouped images include detection of potentially mislabeled images that may be subsequently corrected and/or detection of deviations in a characteristic of a maintenance asset (e.g., a significant change in thermal or visual characteristic) that should be investigated (e.g., that the temperature of wires within a particular electrical panel has changed significantly over time).

Figure 4A:
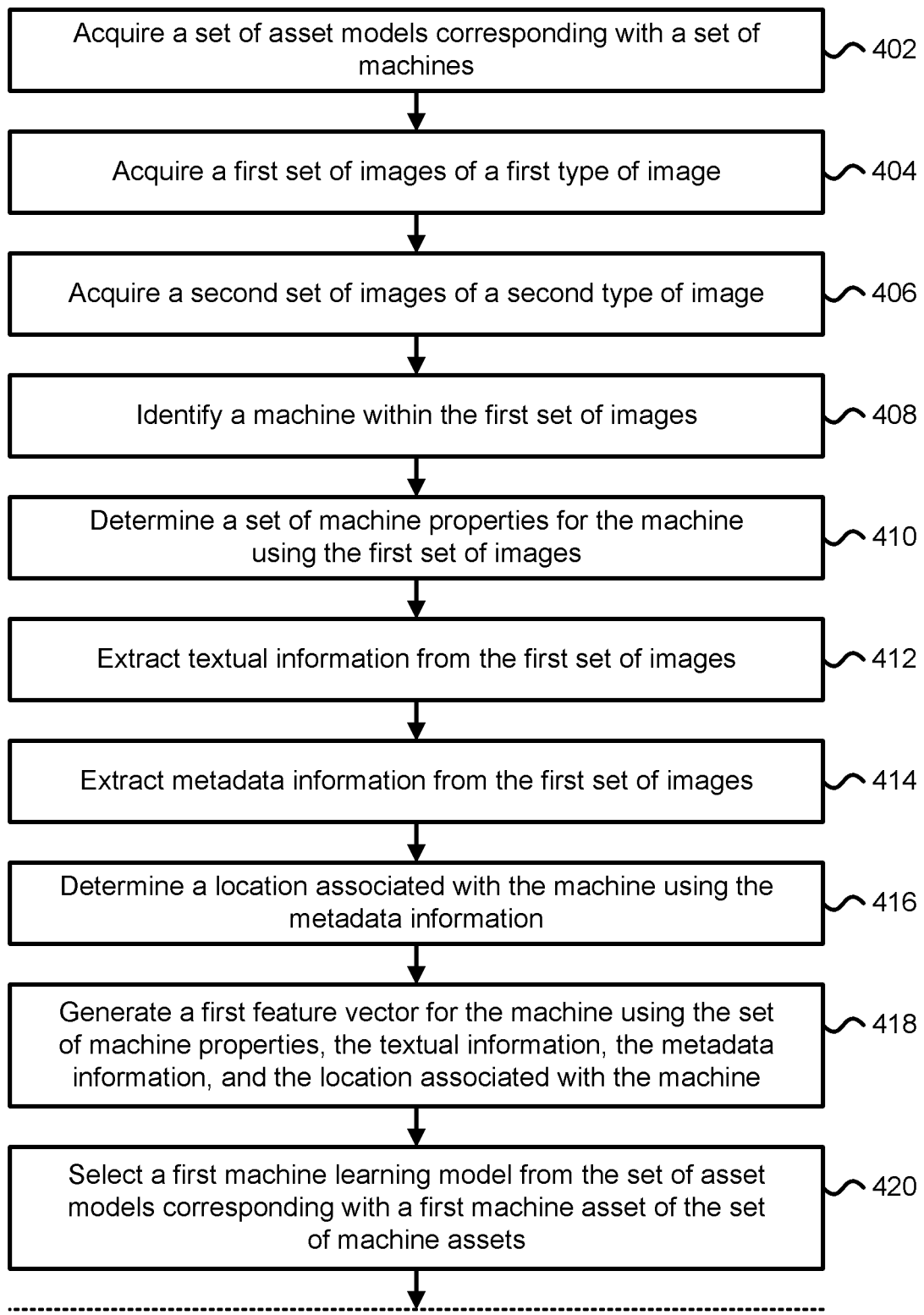
FIGS. 4A-4C depict a flowchart describing an embodiment of a process for generating an asset identifier given a set of diagnostic images.
Figure 4B:
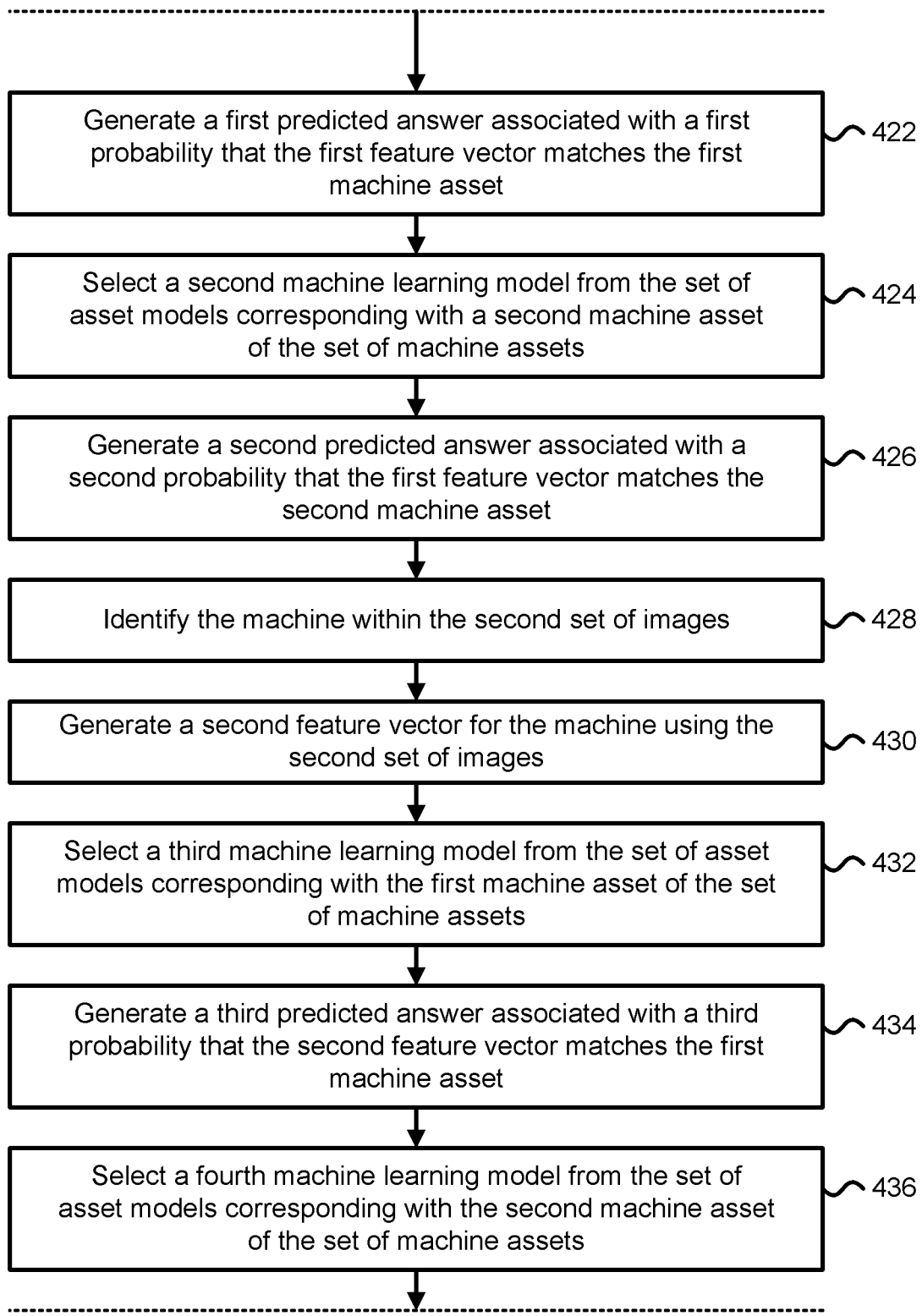
Figure 4C:
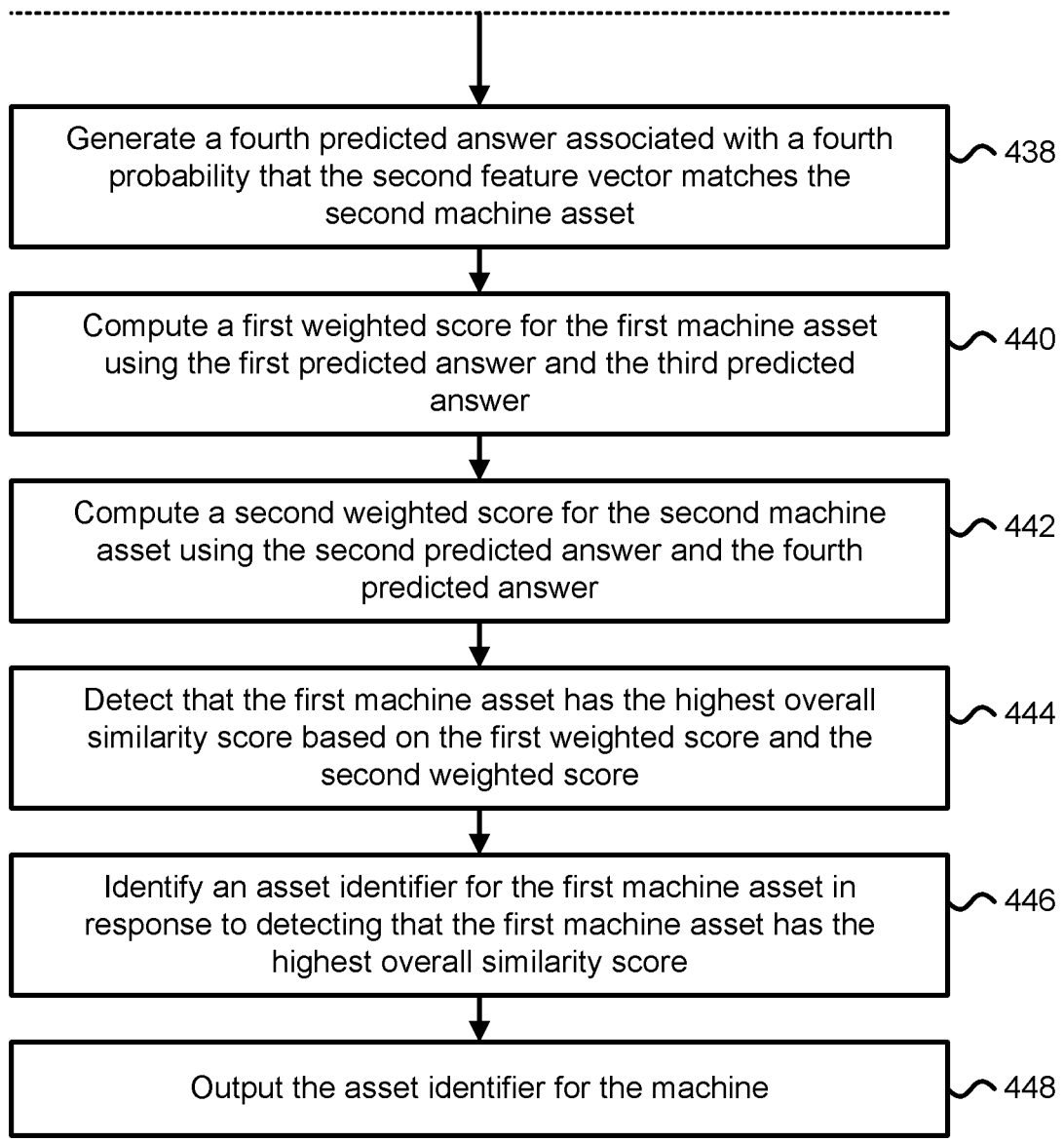

FIG. 4A-4C depict a flowchart describing an embodiment of a process for generating an asset identifier given a set of diagnostic images. In at least one embodiment, the process of FIGS. 4A-4C may be performed by a diagnostic image linking system, such as the diagnostic image linking system 140 in FIG. 2. In some embodiments, the process or portions of the process of FIGS. 4A-4C may be performed using one or more virtual machines and one or more virtual storage devices.

In step 402, a set of asset models corresponding with a set of machines is acquired. The set of machines may correspond with a collection of maintenance assets that are stored within a maintenance assets database, such as asset profiles database 232 in FIG. 2. The set of asset models may comprise machine learning models for the set of machines. In step 404, a first set of images of a first type of image is acquired using a first imaging modality. The first type of image may comprise thermal images for example, and the first set of images may comprise a first set of thermal images. In step 406, a second set of images of a second type of image is acquired using a different second imaging modality. The second type of image may comprise VL images for example, and the second set of images may comprise a second set of VL images. In at least one embodiment, both the first set of images and the second set of images may be stored within a common electronic file. For example, both thermal images and corresponding VL images may be captured simultaneously, or nearly simultaneously, and stored within the common electronic file. In step 408, a machine within the first set of images is identified or detected. In at least one embodiment, the machine may be identified or detected using machine learning, object detection, and/or computer vision techniques. In at least one example, the machine may comprise a washing machine that has been detected within the first set of images and/or the second set of images. The first set of images may capture different angles of the washing machine.

In some cases, the machine may be identified within the first set of images by detecting the machine within the first set of images using machine learning, image classification, object detection, and/or computer vision techniques. In other cases, to detect a machine within the first set of images, object recognition techniques that identify objects within images may be utilized.

In step 410, a set of machine properties for the machine is determined using the first set of images and/or the second set of images. The set of machine properties may include exterior dimensions for the machine, interior dimensions for the machine, identification of any text or labels on the exterior of the machine or inside the machine, identification of components within the machine, the location of visible machine features (e.g., switches and buttons), and the location of visible defects on the surface of the machine (e.g., scratches and dents) or inside the machine. The location of visible defects on the exterior surface of the machine or inside the machine may be used to uniquely identify the machine.

In step 412, textual information is extracted from the first set of images. In some cases, the textual information may comprise overlay textual information that was added to the first set of images by a maintenance technician, textual information extracted from metadata associated with the first set of images, and/or textual information extracted from equipment labeling captured by the first set of images. In step 414, metadata information is extracted from the first set of images. The metadata information may comprise date and time information for when the first set of images were captured and location information (e.g., GPS location information) for where the first set of images were captured. In step 416, a location associated with the machine is determined using the metadata information.

In step 418, a first feature vector for the machine is generated using the first set of images. The first feature vector for the machine may also be generated using the set of machine properties, the textual information, the metadata information, and the location associated with the machine that were derived from the first set of images. In step 420, a first machine learning model is selected from the set of asset models corresponding with a first machine asset of the set of machine assets. In at least one example, the first machine learning model may correspond with the machine learning model for the maintenance asset 382 associated with the asset identifier Asset-X123 in FIG. 3C that is used for generating predicted answers for thermal images. A predicted answer may correspond with a probability or likelihood that an inputted feature vector belongs to a particular maintenance asset. In some cases, the predicted answer may comprise a confidence score (e.g., comprising a number ranging from 0 to 1) that represents the likelihood that the output of a machine learning model is the correct answer.

In step 422, a first predicted answer associated with a first probability that the first feature vector matches the first machine asset is generated. In step 424, a second machine learning model is selected from the set of asset models corresponding with a second machine asset of the set of machine assets. In at least one example, the second machine learning model may correspond with the machine learning model for the maintenance asset 386 associated with the asset identifier Asset-X125 in FIG. 3C that is used for generating predicted answers for thermal images. In step 426, a second predicted answer associated with a second probability that the first feature vector matches the second machine asset is generated. In some embodiments, predicted answers may be generated for each maintenance asset within a collection of maintenance assets.

In step 428, the machine is identified within the second set of images. The machine may be identified within the second set of images using machine learning, object detection, and/or computer vision techniques. In step 430, a second feature vector for the machine is generated using the second set of images. In some cases, the second feature vector may be generated using machine properties, textual information, metadata information, and location information that were derived from the second set of images. In at least one embodiment, the first set of images may comprise thermal images and the first feature vector may correspond with thermal characteristics of the machine and the second set of images may comprise visible-light or color images and the second feature vector may correspond with visual characteristics of the machine.

In step 432, a third machine learning model is selected from the set of asset models corresponding with the first machine asset of the set of machine assets. In step 434, a third predicted answer associated with a third probability that the second feature vector matches the first machine asset is generated. In step 436, a fourth machine learning model is selected from the set of asset models corresponding with the second machine asset of the set of machine assets. In step 438, a fourth predicted answer associated with a fourth probability that the second feature vector matches the second machine asset is generated. In step 440, a first weighted score (or a weighted overall similarity score) for the first machine asset is computed using the first predicted answer and the third predicted answer. In step 442, a second weighted score (or a weighted overall similarity score) for the second machine asset is computed using the second predicted answer and the fourth predicted answer. In at least one example, the first weighted score may correspond with the overall similarity score 392 in FIG. 3F for the maintenance asset Asset-X123 and the second weighted score may correspond with the overall similarity score 396 for the maintenance asset Asset-X125.

In step 444, it is detected that the first machine asset has the highest weighted score (or the highest overall similarity score) based on the first weighted score and the second weighted score. In step 446, an asset identifier for the first machine asset is identified in response to detecting that the first machine asset has the highest overall similarity score or the highest weighted score out of all weighted scores calculated for each machine within the set of machines. The asset identifier may comprise a unique value (e.g., alphanumeric value) that corresponds with the machine out of the set of machines with the highest overall similarity score or the highest weighted score. In step 448, the asset identifier for the machine is outputted. In at least one example, the asset identifier may be transmitted to a server, such as server 116 in FIG. 1. In another example, the asset identifier may be displayed using a display of an electronic device, such as the mobile phone 110 in FIG. 1.

Figure 5A:
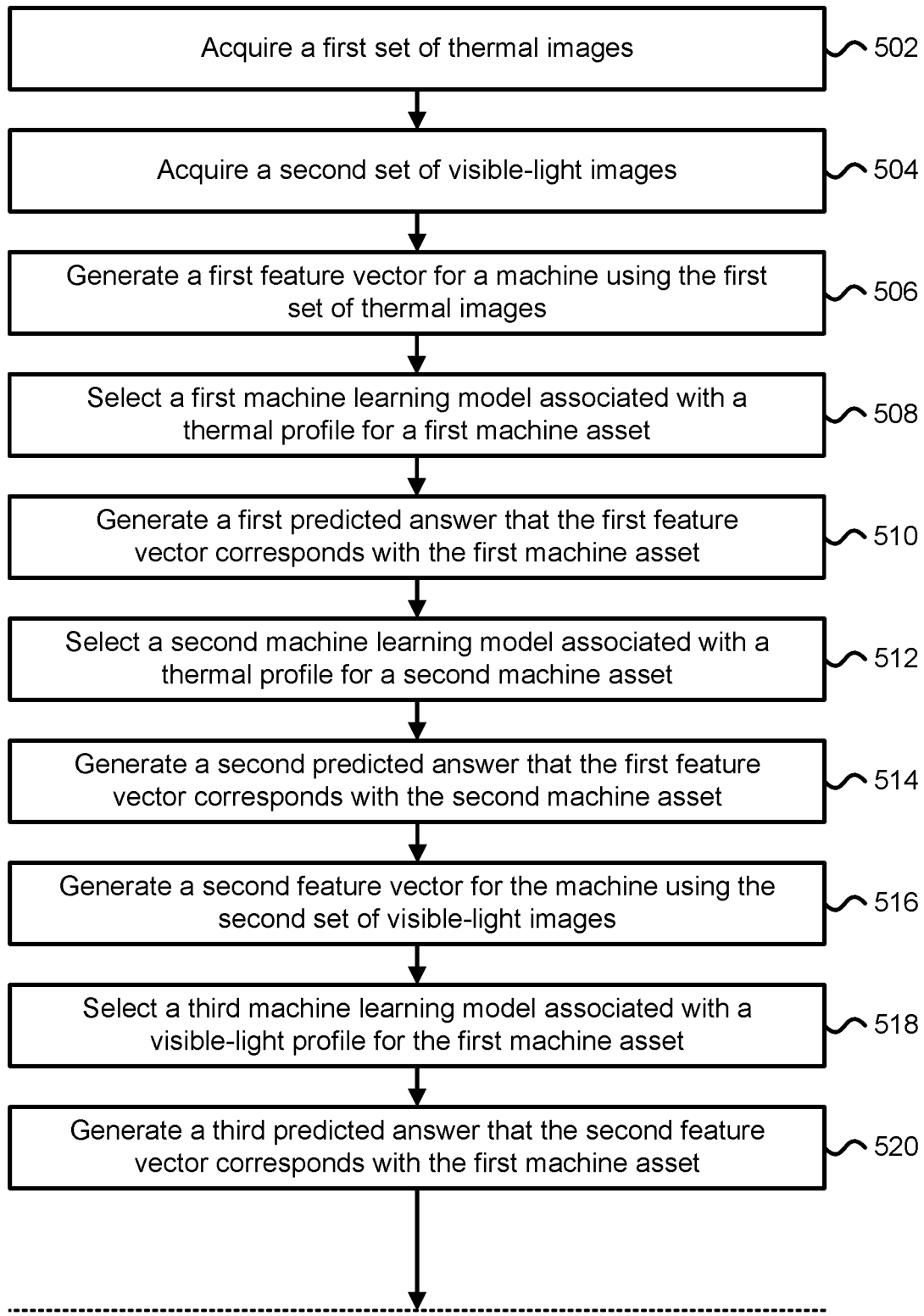
FIGS. 5A-5B depict a flowchart describing another embodiment of a process for generating an asset identifier given a set of diagnostic images.
Figure 5B:
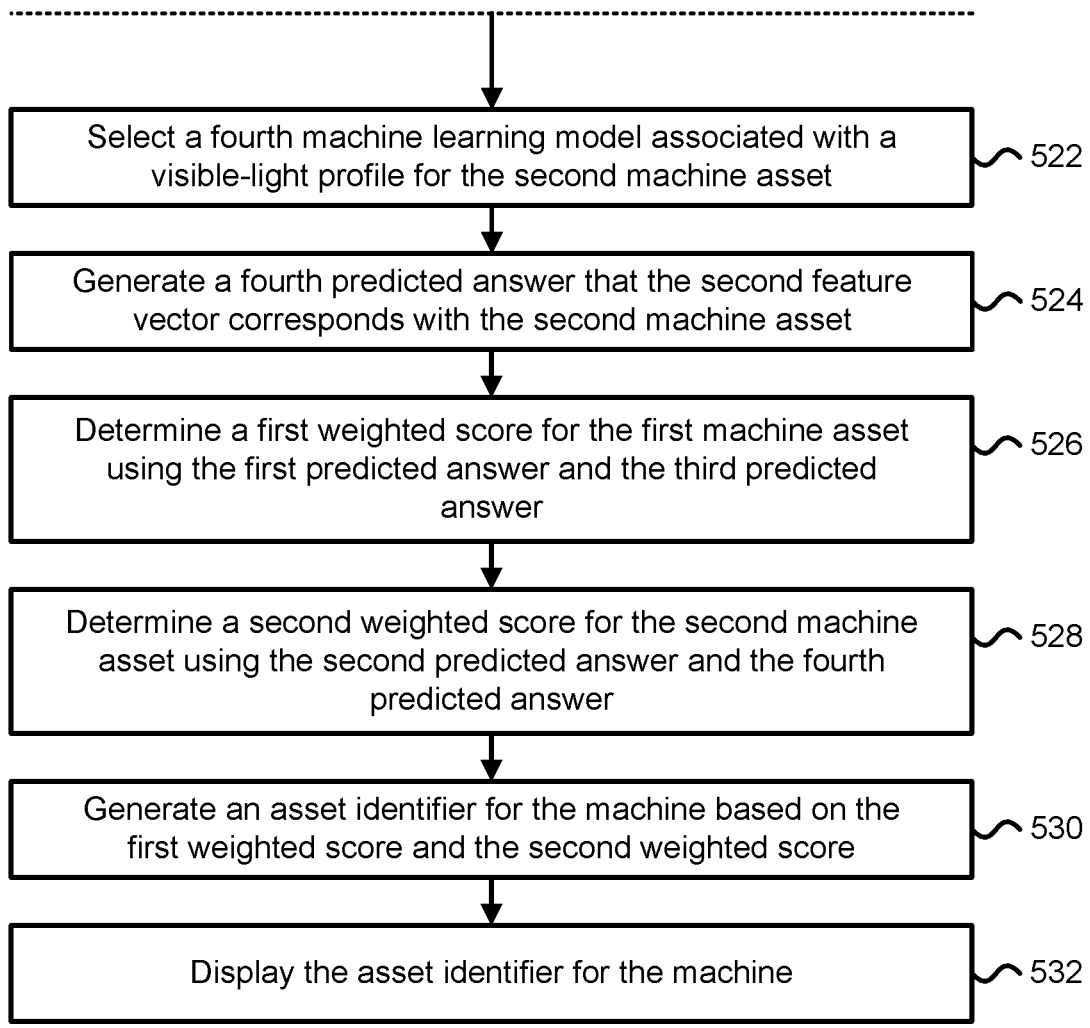

FIGS. 5A and 5B depict a flowchart describing another embodiment of a process for generating an asset identifier given a set of diagnostic images. In at least one embodiment, the process of FIGS. 5A and 5B may be performed by a diagnostic image linking system, such as the diagnostic image linking system 140 in FIG. 2. In some embodiments, the process or portions of the process of FIGS. 5A and 5B may be performed using one or more virtual machines and one or more virtual storage devices.

In step 502, a first set of thermal images is acquired. In step 504, a second set of VL images is acquired. In step 506, a first feature vector for a machine captured by the first set of thermal images is generated using the first set of thermal images. In step 508, a first machine learning model associated with a thermal profile for a first machine asset is selected. The first machine asset may comprise one of the machine assets within a collection of machine assets. In step 510, a first predicted answer (e.g., a probability value) that the first feature vector corresponds with the first machine asset is generated.

In step 512, a second machine learning model associated with a thermal profile for a second machine asset different from the first machine asset is selected. The second machine asset may comprise another of the machine assets within the collection of machine assets. In step 514, a second predicted answer that the first feature vector corresponds with the second machine asset is generated.

In step 516, a second feature vector for the machine is generated using the second set of VL images. In at least one example, the second set of VL images may comprise images showing different angles or perspectives of the machine. In step 518, a third machine learning model associated with a color profile or a visible-light profile for the first machine asset is selected. In step 520, a third predicted answer that the second feature vector corresponds with the first machine asset is generated. In step 522, a fourth machine learning model associated with a color profile or a visible-light profile for the second machine asset is selected. In step 524, a fourth predicted answer that the second feature vector corresponds with the second machine asset is generated. In step 526, a first weighted score for the first machine asset is determined using the first predicted answer and the third predicted answer. In step 528, a second weighted score for the second machine asset is determined using the second predicted answer and the fourth predicted answer. In at least one example, the first weighted score may correspond with the overall similarity score 392 in FIG. 3F for the maintenance asset Asset-X123 and the second weighted score may correspond with the overall similarity score 396 for the maintenance asset Asset-X125.

In step 530, an asset identifier for the machine is generated using the first weighted score and the second weighted score. In some cases, the asset identifier may be generated by first determining which machine asset out of a collection of machine assets has the highest overall similarity score and then acquiring (e.g., via a lookup table) a unique identifier for the machine asset with the highest overall similarity score. In step 532, the asset identifier or a unique alphanumeric value for the machine is displayed or transmitted to an electronic device. In at least one embodiment, the asset identifier for the machine is identified in response to detecting that the first machine asset has the highest overall similarity score or the highest weighted score out of all weighted scores.

Figure 6A:
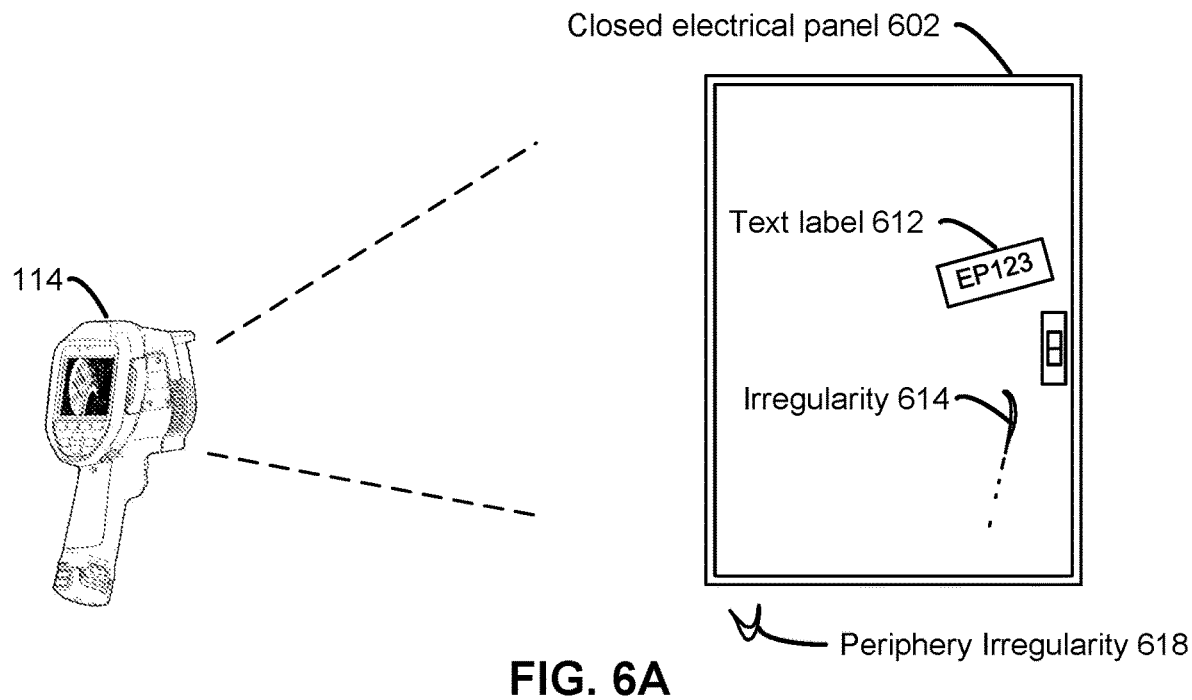
FIG. 6A depicts an embodiment of a thermal camera capturing an exterior view of an electrical panel.

FIG. 6A depicts an embodiment of a thermal camera 114 capturing an exterior view of an electrical panel 602. As depicted, the door of the electrical panel 602 is closed such that an interior space of the electrical panel 602 is not visible. On an external surface of the electrical panel 602 there exists an irregularity 614 (e.g., a scratch or a dent within the door of the electrical panel 602) and a text label 612. The text label 612 may be associated with a manufacturer of the electrical panel 602 or specify a unique identification for the electrical panel 602. The text label 612 may be affixed to the external surface of the door of the electrical panel. Both the text EP123 of the text label 612 and the angle and size of the lettering used for the text label 612 may be used to uniquely identify the electrical panel 602. The irregularity 614 (e.g., a unique scratch on the external surface of the door of the electrical panel 602) may also be used to uniquely identify the electrical panel 602. Moreover, in situations where a maintenance asset is fixed in a location (e.g., installed in a wall), periphery information, such as a periphery irregularity 618 that may comprise a unique marking or dent in a wall close to the electrical panel 602, may also be used to uniquely identify the electrical panel 602.

The thermal camera 114 may simultaneously capture both thermal images and VL images of the exterior view of the electrical panel 602. The images of the exterior view of the electrical panel 602 may capture external attributes of the electrical panel 602. In some cases, the thermal camera 114 may capture the exterior view of the electrical panel 602 and an attached or adjacent periphery for the electrical panel 602. As an example, the electrical panel 602 may be located within a cutout of a wall and the adjacent periphery for the electrical panel 602 may comprise one foot of wall surrounding the electrical panel 602. As the electrical panel 602 may be fixed in position within the wall, the adjacent periphery may include periphery information such as peripheral irregularities (e.g., paint marks, visible dents, smudges, and unique wall features) that may be used to uniquely identify the asset identifier for the electrical panel 602.

Figure 6B:
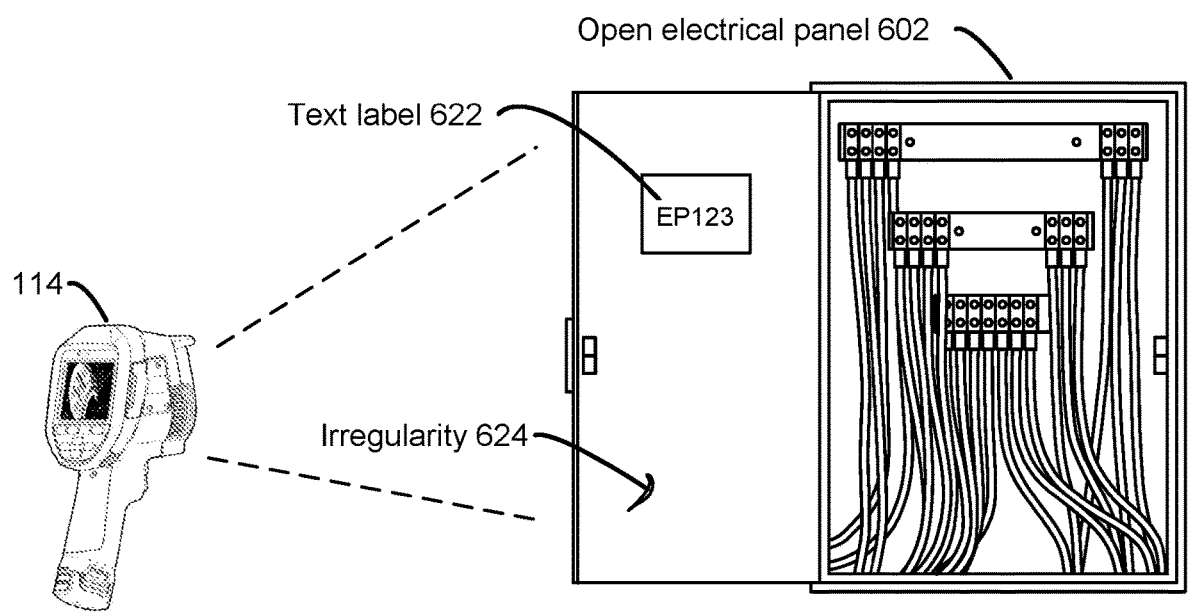
FIG. 6B depicts an embodiment of the thermal camera capturing an interior space of the electrical panel.

FIG. 6B depicts an embodiment of the thermal camera 114 capturing an interior space of the electrical panel 602. As depicted, the door of the electrical panel 602 is open such that the interior space of the electrical panel 602 is visible. Within the interior space of the electrical panel 602, there exists an irregularity 624 (e.g., a scratch or dent within a metal bracket) and a text label 622 (e.g., a barcode for an internal component or a label identifying the electrical panel). In addition to the irregularity 624 and the text label 622, a unique positioning or arrangement of wires within the electrical panel 602 may be used to uniquely identify an asset identifier for the electrical panel 602.

Figure 6C:
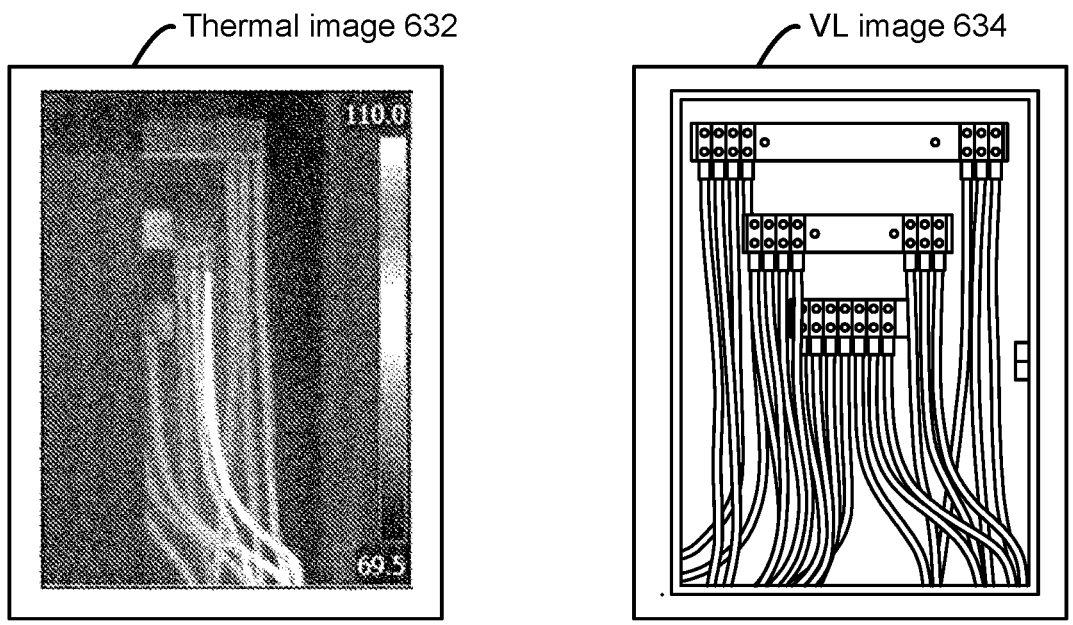
FIG. 6C depicts an embodiment of a first thermal image that has been grouped with a first VL image based on timestamp information for the images.

FIG. 6C depicts an embodiment of a first thermal image 632 that has been grouped with a first VL image 634 based on timestamp information for the images. The first thermal image 632 and the first VL image 634 may have been simultaneously captured using a thermal camera, such as the thermal camera 114 in FIG. 1. A diagnostic image linking system, such as the diagnostic image linking system 140 in FIG. 3G, may generate a first asset-match-likelihood vector for the first thermal image 632 and generate a second asset-match-likelihood vector for the first VL image 634.

The first asset-match-likelihood vector may be compared with ground truth feature vectors associated with thermal images of assets stored within a ground truth feature vectors database, such as the ground truth feature vectors database 338. The second asset-match-likelihood vector may be compared with ground truth feature vectors associated with VL images of assets stored within the ground truth feature vectors database. For each asset within a collection of maintenance assets, an overall similarity score may be generated using the first asset-match-likelihood vector and the second asset-match-likelihood vector. An asset identifier for the specific asset within the collection of maintenance assets with the highest overall similarity score may be identified and displayed using a display of a computing device. An asset-match-likelihood vector may be compared with ground truth feature vectors using an image distance or similarity measure, such as Euclidean distance or cosine similarity.

Figure 6D:
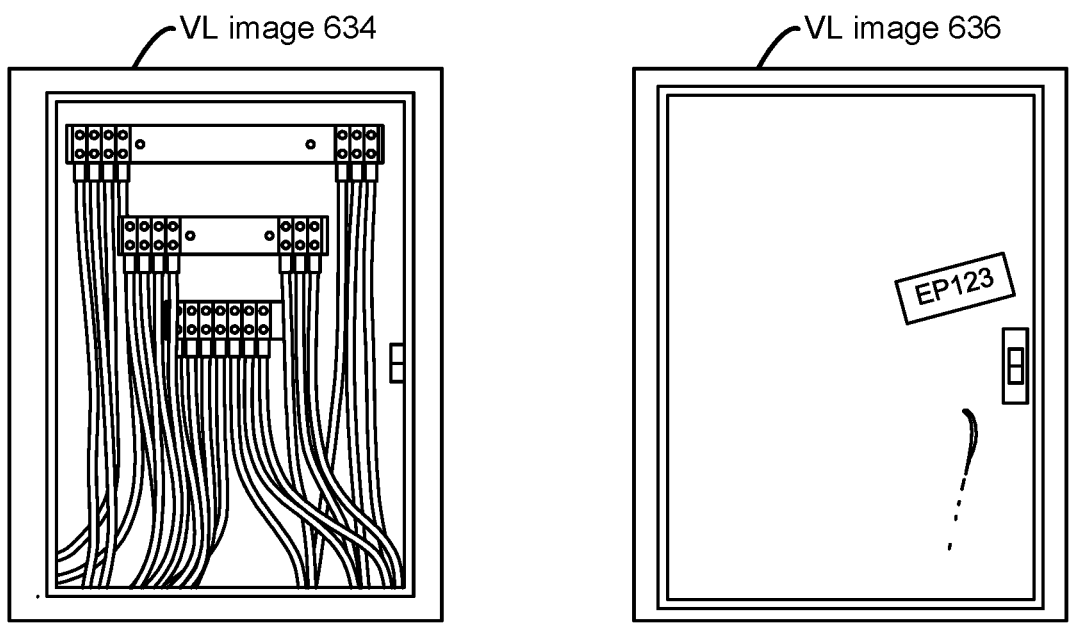
FIG. 6D depicts an embodiment of a second VL image that has been grouped with the first VL image of FIG. 6C based on timestamp information for the images.

FIG. 6D depicts an embodiment of a second VL image 636 that has been grouped with the first VL image 634 of FIG. 6C based on timestamp information for the images. In this case, two different VL images capturing both the exterior appearance of an electrical panel and the appearance of an interior space of the same electrical panel have been grouped such that two different asset-match-likelihood vectors associated with the external appearance of the electrical panel and the interior space of the electrical panel may be compared with corresponding feature vectors within a ground truth feature vectors database. A diagnostic image linking system, such as the diagnostic image linking system 140 in FIG. 3G, may generate a first asset-match-likelihood vector for the first VL image 634 and generate a second asset-match-likelihood vector for the second VL image 636. The first asset-match-likelihood vector may be compared with ground truth feature vectors associated with internal VL images of assets stored within a ground truth feature vectors database, such as the ground truth feature vectors database 338. The second asset-match-likelihood vector may be compared with ground truth feature vectors associated with external VL images of assets stored within the ground truth feature vectors database. For each asset within a collection of maintenance assets, an overall similarity score may be generated using the first asset-match-likelihood vector and the second asset-match-likelihood vector. An asset identifier for the specific asset within the collection of maintenance assets with the highest overall similarity score may be identified and displayed using a display of a computing device.

Figure 6E:
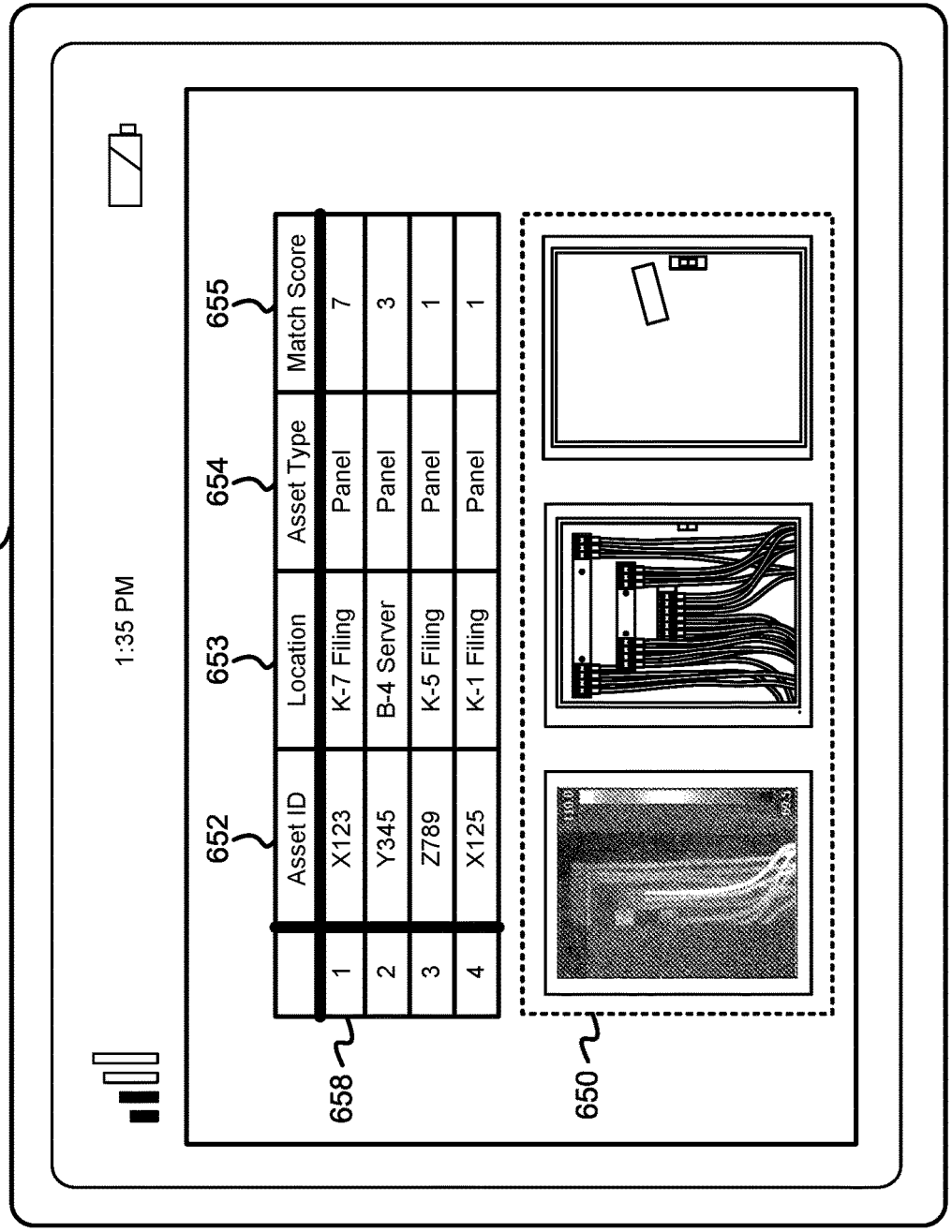
FIG. 6E depicts an embodiment of a computing device that includes a display for displaying a user interface for interacting with a diagnostic image linking system.

FIG. 6E depicts an embodiment of a computing device 680 that includes a display for displaying a user interface for interacting with a diagnostic image linking system. In one example, the computing device 680 may correspond with a tablet computing device or a mobile computing device, such as the laptop computing device 112 in FIG. 1. As depicted, the computing device 680 may be in communication with a diagnostic image linking system, such as the diagnostic image linking system 140 in FIG. 1 via a wireless networking connection. An end user of the computing device 680 may select a group of images 650 that captured a maintenance asset (e.g., an electrical panel). The group of images 650 may include an external VL image of the maintenance asset, an internal VL image of the maintenance asset, and an internal thermal image of the maintenance asset. The computing device 680 may display a table showing the top scoring maintenance assets within a ground truth database that potentially match the maintenance asset captured by the group of images 650. The table includes columns showing asset identifiers 652 for the top scoring maintenance assets, locations 653 for the top scoring maintenance assets, asset types 654 for the top scoring maintenance assets, and an overall similarity score (or match score) 655 for the top scoring maintenance assets. The user interface may allow the end user of the computing device 680 to confirm the correct asset identifier for the group of images 650. For example, the end user may select the top row 658 associated with the asset identifier X123 to confirm that the top scoring maintenance asset outputted by the diagnostic image linking system is the correct asset identifier for the group of images 650. Upon confirmation from the end user that the group of images 650 should be linked with the maintenance asset with the asset identifier X123, a ground truth database for a collection of maintenance assets may be updated to include image feature vectors for the group of images 650.

Figure 7A:
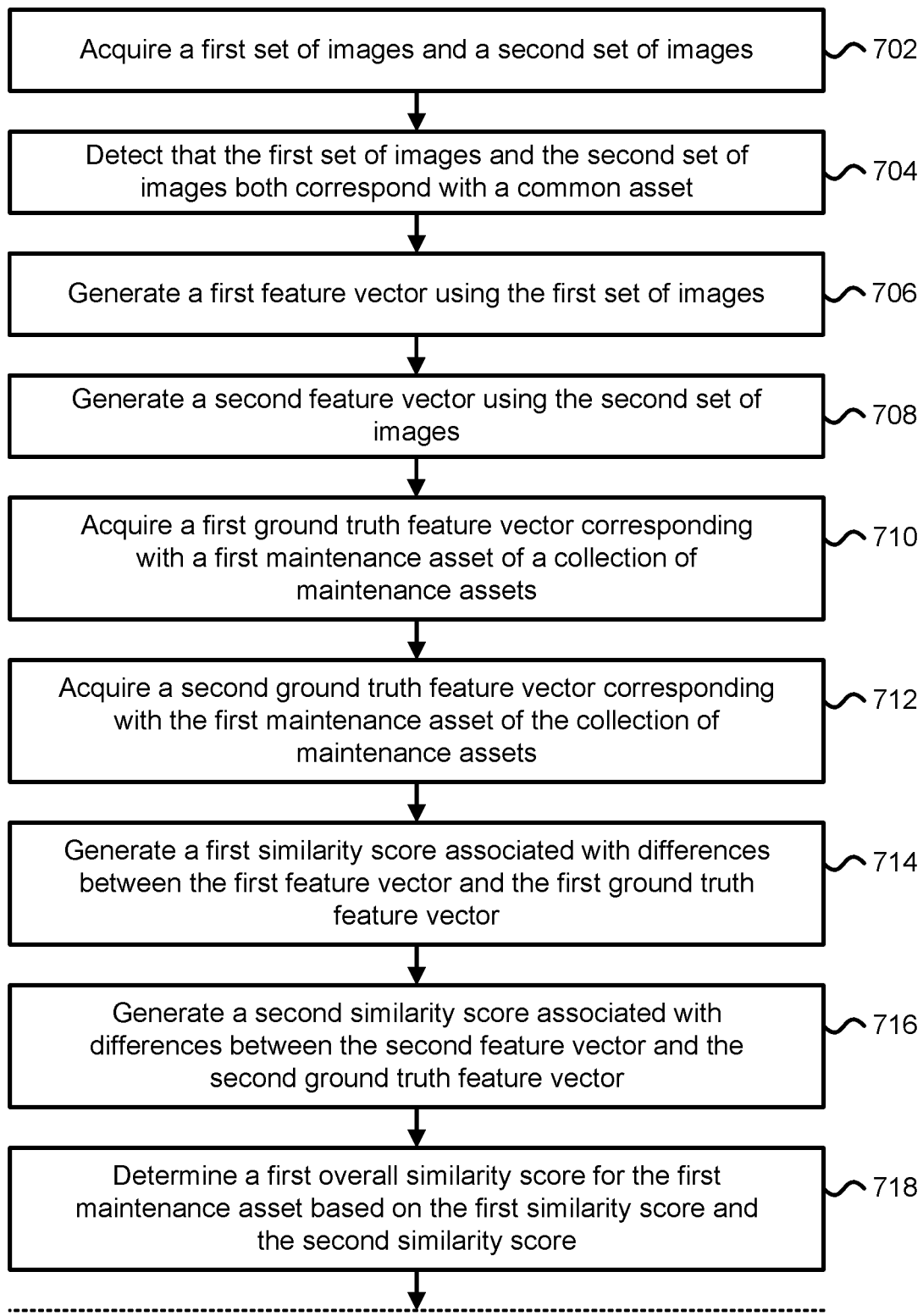
FIGS. 7A and 7B depict a flowchart describing an embodiment of a process for identifying an asset identifier given a set of images.
Figure 7B:
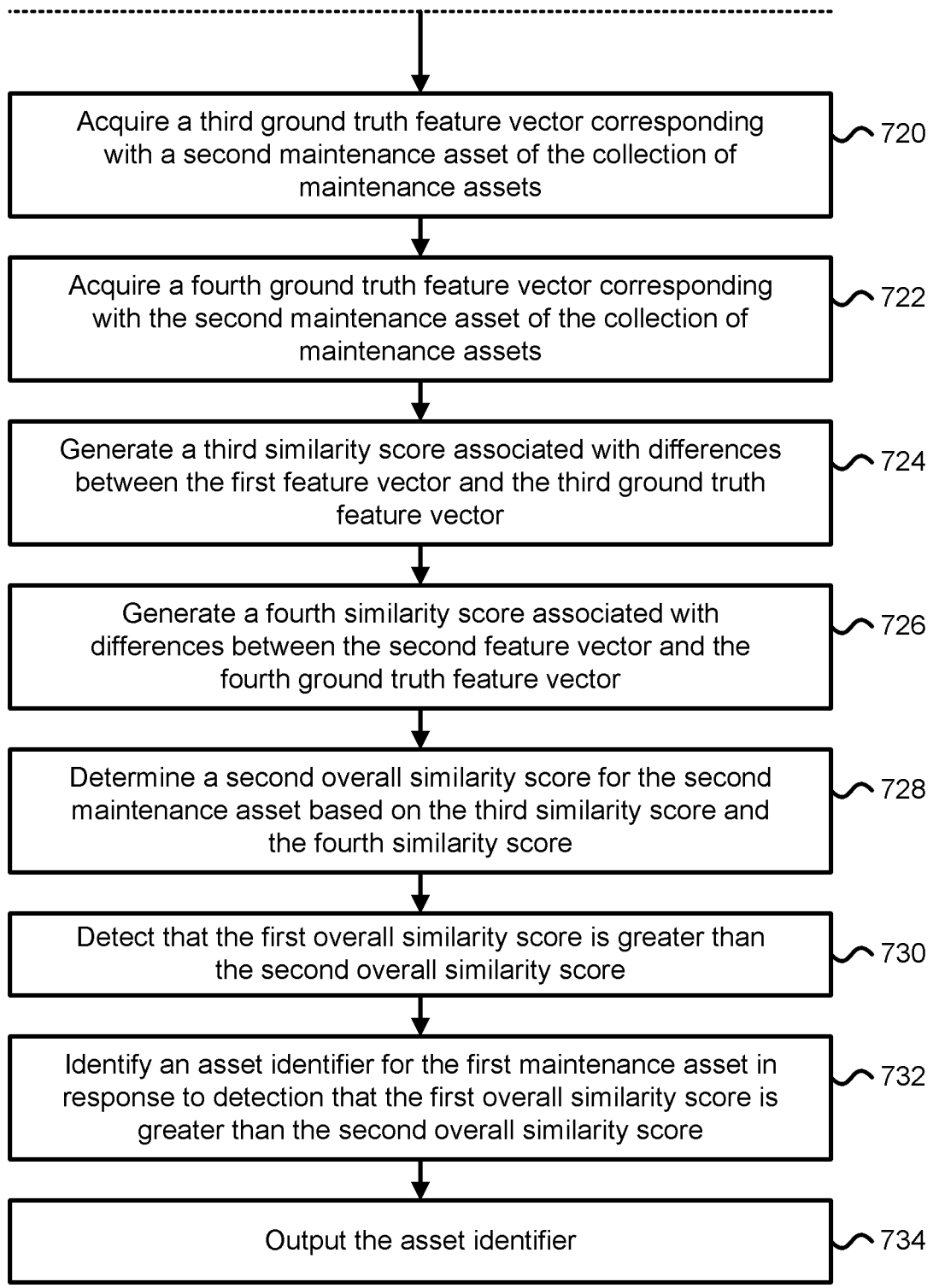

FIGS. 7A and 7B depict a flowchart describing an embodiment of a process for identifying an asset identifier given a set of images. In at least one embodiment, the process of FIGS. 7A and 7B may be performed by a diagnostic image linking system, such as the diagnostic image linking system 140 in FIG. 2. In some embodiments, the process or portions of the process of FIGS. 7A and 7B may be performed using one or more virtual machines and one or more virtual storage devices.

In step 702, a first set of images and a second set of images are acquired. In one example, the first set of images may comprise a thermal image and the second set of images may comprise a VL image. In another example, the first set of images may comprise a first thermal image of an interior space of a captured machine or equipment and the second set of images may comprise a second thermal image of an exterior of the captured machine or equipment. In step 704, it is detected that the first set of images and the second set of images both correspond with a common asset or machine. In one example, object detection may be used to detect that both the first set of images and the second set of images capture portions of an electrical panel. In another example, it may be detected that the first set of images and the second set of images both correspond with the common asset or machine if both the first set of images and the second set of images were captured simultaneously by the same capturing device, such as thermal camera 114 in FIG. 1.

In step 706, a first feature vector is generated using the first set of images. In one embodiment, the first feature vector may be generated using one or more machine learning models. In step 708, a second feature vector is generated using the second set of images. In one embodiment, the first feature vector may be generated using a first machine learning model corresponding with thermal images and the second feature vector may be generated using a second machine learning model corresponding with VL images. In step 710, a first ground truth feature vector corresponding with a first maintenance asset of a collection of maintenance assets is acquired. The first ground truth feature vector may be acquired from a ground truth feature vectors database, such as ground truth feature vectors database 338 in FIG. 3G. In step 712, a second ground truth feature vector corresponding with the first maintenance asset of the collection of maintenance assets is acquired. In one embodiment, if it is detected that the first set of images corresponds with thermal images, then the first ground truth feature vector may comprise a feature vector for the first maintenance asset also corresponding with thermal images. In another embodiment, the first ground truth feature vector may correspond with an internal space of the first maintenance asset and the second ground truth feature vector may correspond with an exterior view of the first maintenance asset.

In step 714, a first similarity score corresponding with differences between the first feature vector and the first ground truth feature vector is generated. In one example, the first similarity score may be generated using, for example, cosine similarity or a Euclidean distance between the first feature vector and the first ground truth feature vector. In step 716, a second similarity score corresponding with differences between the second feature vector and the second ground truth feature vector is generated. In one example, the second similarity score may be generated based on a degree of similarity between the second feature vector and the second ground truth feature vector. The degree of similarity may be computed based on a Euclidean distance between the second feature vector and the second ground truth feature vector or a cosine similarity between the second feature vector and the second ground truth feature vector.

In step 718, a first overall similarity score for the first maintenance asset is determined based on the first similarity score and the second similarity score. In at least one example, the overall similarity score may comprise a weighted sum of the first similarity score and the second similarity score. In some cases, feature vectors associated with thermal images may be weighted more than feature vectors associated with VL images. In another example, the first overall similarity score may comprise an average of the first similarity score and the second similarity score.

In step 720, a third ground truth feature vector corresponding with a second maintenance asset of the collection of maintenance assets is acquired. In step 722, a fourth ground truth feature vector corresponding with the second maintenance asset of the collection of maintenance assets is acquired. Both the third ground truth feature vector and the fourth ground truth feature vector may be acquired from a database of ground truth feature vectors, such as ground truth feature vectors database 338 in FIG. 3G. In step 724, a third similarity score corresponding with differences between the first feature vector and the third ground truth feature vector is generated. In step 726, a fourth similarity score corresponding with differences between the second feature vector and the fourth ground truth feature vector is generated. In step 728, a second overall similarity score for the second maintenance asset is determined based on the third similarity score and the fourth similarity score.

In step 730, it is detected that the first overall similarity score is greater than the second overall similarity score. In some cases, the first overall similarity score may be greater than any other overall similarity scores computed for other maintenance assets of the collection of maintenance assets. The first overall similarity score may comprise the highest overall similarity score over all similarity scores for the collection of maintenance assets. In step 732, an asset identifier for the first maintenance asset is identified in response to detection that the first overall similarity score is greater than the second overall similarity score or that the first overall similarity score comprises the highest overall similarity score out of all similarity scores computed for the collection of minutes assets. In step 734, the asset identifier is outputted. The asset identifier may be transmitted to a computing device, such as server 160 in FIG. 1 or laptop computer 112 in FIG. 1. The asset identifier may be displayed using a display of a computing device, such as the computing device 680 in FIG. 6E.

Figure 7C:
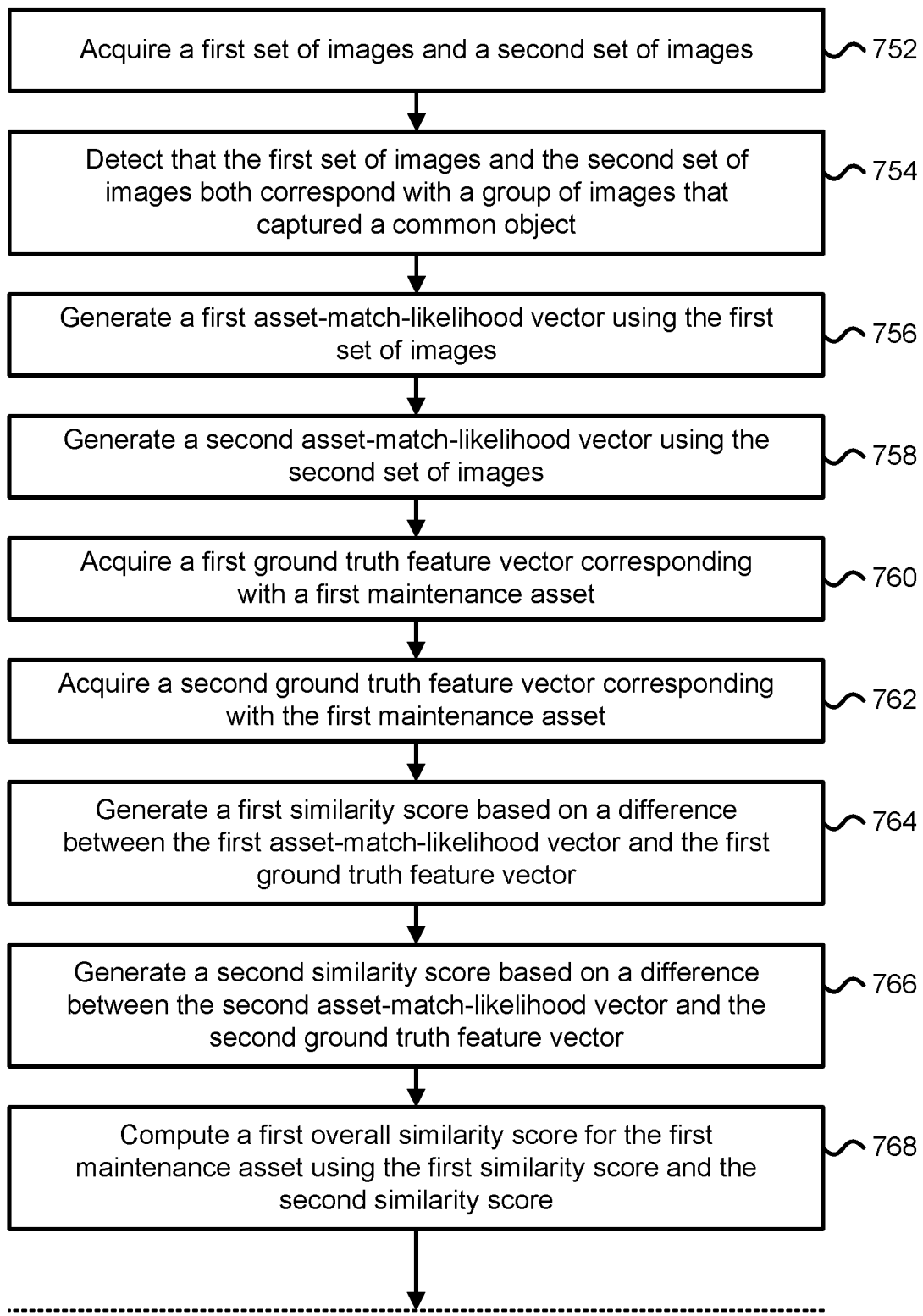
FIGS. 7C and 7D depict a flowchart describing another embodiment of a process for identifying an asset identifier given a set of images.
Figure 7D:
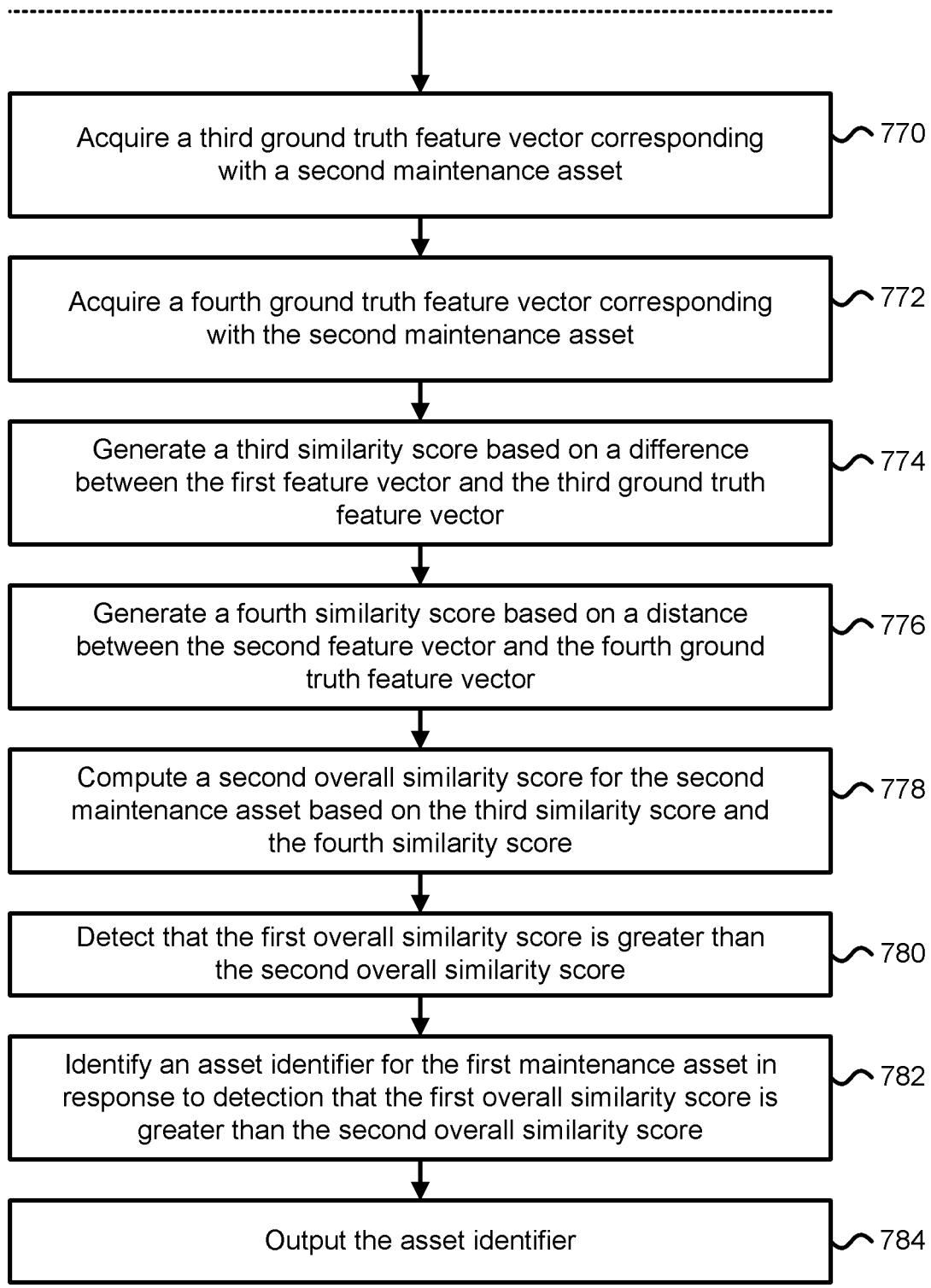

FIGS. 7C and 7D depict a flowchart describing another embodiment of a process for identifying an asset identifier given a set of images. In at least one embodiment, the process of FIGS. 7C and 7D may be performed by a diagnostic image linking system, such as the diagnostic image linking system 140 in FIG. 2. In some embodiments, the process or portions of the process of FIGS. 7C and 7D may be performed using one or more virtual machines and one or more virtual storage devices.

In step 752, a first set of images and a second set of images are acquired. The first set of images and the second set of images may be acquired from the same image capturing device, such as thermal camera 114 in FIG. 1. In one example, the first set of images may comprise thermal images and the second set of images may comprise VL images. In another example, the first set of images may comprise an external perspective of a maintenance asset and the second set of images may comprise an internal perspective of the maintenance asset. In step 754, it is detected that the first set of images and the second set of images both correspond with a group of images that captured a common object. The common object may comprise a maintenance asset (e.g., an electrical panel).

In step 756, a first asset-match-likelihood is generated using the first set of images. In step 758, a second asset-match-likelihood vector is generated using the second set of images. The second asset-match-likelihood vector may be generated by applying machine learning techniques, such as image feature extraction, to the second set of images. In step 760, a first ground truth feature vector corresponding with a first maintenance asset is acquired. In step 762, a second ground truth feature vector corresponding with the first maintenance asset is acquired. The first ground truth feature vector may correspond with a first image type (e.g., thermal images) associated with the first set of images and the second ground truth feature vector may correspond with a second image type different from the first image type (e.g., VL images) associated with the second set of images.

In step 764, a first similarity score is generated based on a difference between the first asset-match-likelihood vector and the first ground truth feature vector. The difference may comprise, for example, a Euclidean distance between the two vectors. In step 766, a second similarity score is generated based on a difference between the second asset-match-likelihood vector and the second ground truth feature vector. The difference may correspond, for example, with a cosine similarity between the two vectors. In step 768, a first overall similarity score for the first maintenance asset is computed using the first similarity score and the second similarity score. The first overall similarity score may comprise, for example, a weighted average of the first similarity score and the second similarity score.

In step 770, a third ground truth feature vector corresponding with a second maintenance asset different from the first maintenance asset is acquired. In step 772, a fourth ground truth feature vector corresponding with the second maintenance asset is acquired. In step 774, a third similarity score is generated based on a difference between the first feature vector and the third ground truth feature vector. In step 776, a fourth similarity score is generated based on a distance between the second feature vector and the fourth ground truth feature vector.

In step 778, a second overall similarity score for the second maintenance asset is computed based on the third similarity score and the fourth similarity score. In one example, the second overall similarity score may comprise a weighted average of the third similarity score and the fourth similarity score. In step 780, it is detected that the first overall similarity score is greater than the second overall similarity score. In step 782, an asset identifier for the first maintenance asset is identified in response to detection that the first overall similarity score is greater than the second overall similarity score. In some cases, the first overall similarity score may comprise the greatest similarity score out of all overall similarity scores computed for a collection of maintenance assets. In step 784, the asset identifier is outputted. The asset identifier may comprise a numeric or alphanumeric text string or a label associated with the first maintenance asset. The asset identifier may be outputted by transmitting the asset identifier to a computing device, such as the laptop computer 112 in FIG. 1, or by displaying the asset identifier using a display of the computing device.

In some embodiments, a thermal image may correspond with temperature information captured using a thermal camera and a visible light (VL) image may correspond with visible light information captured using a visible light image sensor or a visible light camera. Each individual pixel within the thermal image may represent a specific temperature data point (e.g., 98 degrees Fahrenheit). Each temperature data point (or a range of temperature data points) may be assigned to a unique color or shade for viewing the temperature information. For example, a first set of temperature data points between 90 and 92 degrees Fahrenheit may be assigned to a first color and a second set of temperature data points between 92 and 94 degrees Fahrenheit may be assigned to a second color different from the first color. The assignment of temperature values to colors or shades may be specified using a color mapping palette. The color mapping palette may translate temperature information into a set of specific colors (e.g., with darker colors corresponding with colder temperatures and lighter colors corresponding with warmer temperatures).

As different thermal cameras may output thermal images that use different color palettes that assign different colors to the same temperature data points, a color standardization application may be used to standardize the colors used for displaying temperature information across the different thermal images. A technical benefit of standardizing the colors assigned to temperature data points across different thermal images deriving from different thermal cameras is that standardized thermal images that use the same color palette may be inputted to the same diagnostic image linking system to generate image feature vectors for the thermal images or inputted to the same machine learning model to identify a set of maintenance assets. Prior to inputting different thermal images of a maintenance asset that were captured using different thermal cameras, the color standardization application may standardize the color palette used by generating a new set of thermal images from the different thermal images, wherein each image of the new set of thermal images is generated using the same color palette.

In some embodiments, the image and text syncing system 336 of FIG. 3G may perform color standardization for different thermal images of a maintenance asset that were captured using different thermal cameras prior to sending the standardized thermal images to a feature vector generator, such as the feature vector generator 330 of FIG. 3G, in order to generate corresponding thermal-image based feature vectors.

At least one embodiment of the disclosed technology includes acquiring a first set of images and a second set of images, identifying a first feature vector using the first set of images and a second feature vector using the second set of images, generating a first predicted answer that the first feature vector corresponds with the first machine asset using a first machine learning model associated with a first machine asset and that a second predicted answer that the second feature vector corresponds with the first machine asset using a second machine learning model associated with the first machine asset, determining an overall similarity score for the first machine asset using the first predicted answer and the second predicted answer, and outputting an asset identifier for the first machine asset based on the overall similarity score for the first machine asset.

In some cases, the method may further comprise detecting a machine within the first set of images and determining the overall similarity score for the first machine asset using a first weighted coefficient for the first predicted answer that is identified based on a dimension of the machine.

In some cases, the method may further comprise detecting a machine within the first set of images and determining the overall similarity score for the first machine asset using a first weighted coefficient for the first predicted answer that is identified based on an estimated volume of the machine.

At least one embodiment of the disclosed technology comprises a system or an electronic device including a storage device (e.g., a semiconductor memory) and one or more processors in communication with the storage device. The storage device configured to store a first machine learning model associated with a first machine asset and a second machine learning model associated with the first machine asset. The one or more processors configured to acquire a first set of images using a first imaging modality, and a second set of images using a second imaging modality, determine a first feature vector using the first set of images and a second feature vector using the second set of images, generate a first predicted answer that the first feature vector corresponds with the first machine asset using the first machine learning model and a second predicted answer that the second feature vector corresponds with the first machine asset using the second machine learning model, calculate an overall similarity score for the first machine asset using the first predicted answer and the second predicted answer, and identify an asset identifier for the first machine asset based on the overall similarity score for the first machine asset. The first set of images may comprise thermal images and the second set of images may comprise VL images.

At least one embodiment of the disclosed technology comprises one or more storage devices containing processor readable code for configuring one or more processors to perform a method for identifying maintenance assets, wherein the processor readable code configures the one or more processors to acquire a first set of thermal images using a first thermal imaging modality and a second set of VL images using a second VL imaging modality, generate a first feature vector using the first set of thermal images and a second feature vector using the second set of VL images, select a first machine learning model associated with thermal characteristics of a first machine asset and a second machine learning model associated with visual characteristics of the first machine asset, generate a first predicted answer that the first feature vector corresponds with the first machine asset using the first machine learning model and a second predicted answer that the second feature vector corresponds with the first machine asset using the second machine learning model, determine or calculate an overall similarity score for the first machine asset using the first predicted answer and the second predicted answer, and output an asset identifier for the first machine asset based on the overall similarity score for the first machine asset.

At least one embodiment of the disclosed technology comprises a system for identifying assets comprising one or more processors in communication with a storage device configured to store a first machine learning model associated with a first machine asset and a second machine learning model associated with the first machine asset, wherein the one or more processors are configured to acquire a first set of images using a first imaging modality and a second set of images using a second imaging modality, determine a first feature vector using the first set of images and a second feature vector using the second set of images, generate a first predicted answer that the first feature vector corresponds with the first machine asset using the first machine learning model and a second predicted answer that the second feature vector corresponds with the first machine asset using the second machine learning model, calculate an overall similarity score for the first machine asset using the first predicted answer and the second predicted answer and identify an asset identifier for the first machine asset based on the overall similarity score for the first machine asset.

In some embodiments, the one or more processors are configured to detect a machine within the first set of images and identify one or more machine properties for the machine using the first set of images, and the one or more processors are configured to determine the first feature vector based on the one or more machine properties for the machine. The one or more machine properties for the machine may include external dimensions of the machine. In some cases, the one or more processors are configured to detect a machine within the first set of images and identify a weighted coefficient for the first predicted answer based on a dimension of the machine, and the one or more processors are configured to calculate the overall similarity score using the weighted coefficient.

At least one embodiment of the disclosed technology comprises a method for identifying assets comprising acquiring a first set of using a first imaging modality images, and a second set of images using a second imaging modality that is different than the first imaging modality, identifying a first feature vector using the first set of images and a second feature vector using the second set of images, generating a first predicted answer that the first feature vector corresponds with a first machine asset using a first machine learning model associated with the first machine asset and a second predicted answer that the second feature vector corresponds with the first machine asset using a second machine learning model associated with the first machine asset, determining an overall similarity score for the first machine asset using the first predicted answer and the second predicted answer, and outputting an asset identifier for the first machine asset based on the overall similarity score for the first machine asset.

In some embodiments, the method may further comprise identifying a third machine learning model associated with a second machine asset and a fourth machine learning model associated with the second machine asset, generating a third predicted answer that the first feature vector corresponds with the second machine asset using the third machine learning model and a fourth predicted answer that the second feature vector corresponds with the second machine asset using the fourth machine learning model, detecting that the overall similarity score for the first machine asset is greater than a second overall similarity score for the second machine asset, and outputting the asset identifier for the first machine asset in response to detecting that the overall similarity score for the first machine asset is greater than the second overall similarity score for the second machine asset.

The disclosed technology may be described in the context of computer-executable instructions being executed by a computer or processor. The computer-executable instructions may correspond with portions of computer program code, routines, programs, objects, software components, data structures, or other types of computer-related structures that may be used to perform processes using a computer. Computer program code used for implementing various operations or aspects of the disclosed technology may be developed using one or more programming languages, including an object oriented programming language such as Java or C++, a function programming language such as Lisp, a procedural programming language such as the "C" programming language or Visual Basic, or a dynamic programming language such as Python or JavaScript. In some cases, computer program code or machine-level instructions derived from the computer program code may execute entirely on an end user's computer, partly on an end user's computer, partly on an end user's computer and partly on a remote computer, or entirely on a remote computer or server.

The flowcharts and block diagrams in the figures provide illustrations of the architecture, functionality, and operation of possible implementations of systems, methods, and computer program products according to various aspects of the disclosed technology. In this regard, each block in a flowchart may correspond with a program module or portion of computer program code, which may comprise one or more computer-executable instructions for implementing the specified functionality. In some implementations, the functionality noted within a block may occur out of the order noted in the figures. For example, two blocks shown in succession may, in fact, be executed substantially concurrently, or the blocks may sometimes be executed in the reverse order, depending upon the functionality involved. In some implementations, the functionality noted within a block may be implemented using hardware, software, or a combination of hardware and software.

For purposes of this document, it should be noted that the dimensions of the various features depicted in the figures may not necessarily be drawn to scale.

For purposes of this document, reference in the specification to "an embodiment," "one embodiment," "some embodiments," or "another embodiment" may be used to describe different embodiments and do not necessarily refer to the same embodiment.

For purposes of this document, a connection may be a direct connection or an indirect connection (e.g., via another part). In some cases, when an element is referred to as being connected or coupled to another element, the element may be directly connected to the other element or indirectly connected to the other element via intervening elements. When an element is referred to as being directly connected to another element, then there are no intervening elements between the element and the other element.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

For the purposes of this document, unless otherwise indicated, the phrase "A and B" is nonlimiting and means one or more of (A) and one or more of (B); the phrase "A or B" is nonexclusive and means one or more of (A), one or more of (B), or one or more of (A and B); the phrase "A and/or B" means one or more of (A), one or more of (B), or one or more of (A and B); the phrase "at least one of A and B" and the phrase "one or more of A and B" both mean one or more of (A) and one or more of (B); and the phrase "at least one of A or B" and the phrase "one or more of A or B" both mean one or more of (A), one or more of (B), or one or more of (A and B). By way of extension, for example, the phrases "at least one of A, B, or C" and "one or more of A, B, or C" both mean one or more of (A), one or more of (B), one or more of (C), one or more of (A and B), one or more of (A and C), one or more of (B and C), or one or more of (A, B and C). In the above, A, B, and C represent any form or type of element, feature, arrangement, component, structure, aspect, action, step, etc.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system for identifying assets, comprising:
one or more processors in communication with a storage device configured to store a first machine learning model associated with a first machine asset and a second machine learning model associated with the first machine asset, wherein the one or more processors are configured to:
acquire a first set of images using a first imaging modality, and a second set of images using a second imaging modality that is different than the first imaging modality;
determine a first feature vector using the first set of images and a second feature vector using the second set of images;
generate a first predicted answer that the first feature vector corresponds with the first machine asset using the first machine learning model and a second predicted answer that the second feature vector corresponds with the first machine asset using the second machine learning model;
calculate an overall similarity score for the first machine asset using the first predicted answer and the second predicted answer; and
identify an asset identifier for the first machine asset based on the overall similarity score for the first machine asset.

2. The system of claim 1, wherein:
the first imaging modality is a thermal imaging modality, and the first set of images comprises thermal images acquired using the thermal imaging modality; and
the second imaging modality is a visible light (VL) imaging modality, and the second set of images comprises VL images acquired using the VL imaging modality.

3. The system of claim 1, wherein:
the one or more processors are configured to detect a machine within the first set of images and identify one or more machine properties for the machine using the first set of images; and
the one or more processors are configured to determine the first feature vector based on the one or more machine properties for the machine.

4. The system of claim 3, wherein:
the one or more machine properties for the machine include external dimensions of the machine.

5. The system of claim 1, wherein:
the one or more processors are configured to detect a machine within the first set of images and identify a weighted coefficient for the first predicted answer based on a dimension of the machine; and
the one or more processors are configured to calculate the overall similarity score using the weighted coefficient.

6. The system of claim 1, wherein:
the one or more processors are configured to determine a weighted coefficient for the first predicted answer based on an estimated distance from a capturing device of the first set of images to the machine.

7. A method for identifying assets, comprising:
acquiring a first set of images using a first imaging modality, and a second set of images using a second imaging modality that is different than the first imaging modality;
identifying a first feature vector using the first set of images and a second feature vector using the second set of images;
generating a first predicted answer that the first feature vector corresponds with a first machine asset using a first machine learning model associated with the first machine asset and a second predicted answer that the second feature vector corresponds with the first machine asset using a second machine learning model associated with the first machine asset;
determining an overall similarity score for the first machine asset using the first predicted answer and the second predicted answer; and
outputting an asset identifier for the first machine asset based on the overall similarity score for the first machine asset.

8. The method of claim 7, further comprising:
identifying a third machine learning model associated with a second machine asset and a fourth machine learning model associated with the second machine asset;
generating a third predicted answer that the first feature vector corresponds with the second machine asset using the third machine learning model and a fourth predicted answer that the second feature vector corresponds with the second machine asset using the fourth machine learning model;
detecting that the overall similarity score for the first machine asset is greater than a second overall similarity score for the second machine asset; and
outputting the asset identifier for the first machine asset in response to detecting that the overall similarity score for the first machine asset is greater than the second overall similarity score for the second machine asset.

9. The method of claim 7, wherein:
the first imaging modality is a thermal imaging modality, and the first set of images comprises thermal images acquired using the thermal imaging modality; and
the second imaging modality an acoustic imaging modality, and the second set of images comprises acoustic images acquired using the acoustic imaging modality.

10. The method of claim 7, further comprising:
detecting a machine captured by the first set of images;
identifying one or more machine properties for the machine using the first set of images; and
generating the first feature vector using the one or more machine properties for the machine.

11. The method of claim 10, wherein:
the one or more machine properties for the machine include external dimensions of the machine.

12. The method of claim 10, wherein:
the one or more machine properties for the machine include a set of internal dimensions of an interior space of the machine.

13. The method of claim 10, wherein:
the one or more machine properties for the machine include a set of components located within an interior space of the machine.

14. The method of claim 7, further comprising:
extracting metadata information from the first set of images; and
determining the overall similarity score using the metadata information.

15. The method of claim 7, further comprising:
extracting location information from the first set of images; and
determining the overall similarity score using the location information.

16. The method of claim 7, wherein:
the determining the overall similarity score for the first machine asset includes identifying a weighted coefficient for the first predicted answer based on an image type of the first set of images.

17. The method of claim 7, further comprising:
detecting a machine within the first set of images using object detection, wherein the determining the overall similarity score for the first machine asset includes identifying a weighted coefficient for the first predicted answer based on at least one dimension of the machine.

18. The method of claim 7, further comprising:
detecting a machine within the first set of images, wherein the determining the overall similarity score for the first machine asset includes identifying a weighted coefficient for the first predicted answer based on an estimated volume of the machine.

19. The method of claim 7, further comprising:
detecting a machine within the first set of images, wherein the determining the overall similarity score for the first machine asset includes identifying a weighted coefficient for the first predicted answer based on an estimated distance from a capturing device of the first set of images to the machine.

20. One or more non-transitory storage devices containing processor readable code for configuring one or more processors to perform a method for identifying maintenance assets,
wherein the processor readable code configures the one or more processors to:
acquire a first set of thermal images using a first imaging modality, and a second set of visible-light images using a second imaging modality that is different than the first imaging modality;
generate a first feature vector using the first set of thermal images and a second feature vector using the second set of visible-light images;
select a first machine learning model associated with thermal characteristics of a first machine asset and a second machine learning model associated with visual characteristics of the first machine asset;
generate a first predicted answer that the first feature vector corresponds with the first machine asset using the first machine learning model and a second predicted answer that the second feature vector corresponds with the first machine asset using the second machine learning model;
determine an overall similarity score for the first machine asset using the first predicted answer and the second predicted answer; and
output an asset identifier for the first machine asset based on the overall similarity score for the first machine asset.

\* \* \* \* \*